US005764955A

United States Patent [19]
Doolan

[11] Patent Number: 5,764,955
[45] Date of Patent: Jun. 9, 1998

[54] GATEWAY FOR USING LEGACY TELECOMMUNICATIONS NETWORK ELEMENT EQUIPMENT WITH A COMMON MANAGEMENT INFORMATION PROTOCOL

[75] Inventor: Paul D. Doolan, Los Gatos, Calif.

[73] Assignee: Oasys Group, Inc., Saratoga, Calif.

[21] Appl. No.: 545,024

[22] Filed: Oct. 19, 1995

[51] Int. Cl.[6] .......... G06F 17/28

[52] U.S. Cl. .......... 395/500; 395/200.2; 379/289

[58] Field of Search .......... 395/500, 650, 395/200.2; 379/10, 243, 201, 289; 370/61; 380/23, 49; 364/419.02, 419.03

[56] References Cited

U.S. PATENT DOCUMENTS

| | | | |
|---|---|---|---|
| 4,782,506 | 11/1988 | Sevcik | 379/10 |
| 5,257,369 | 10/1993 | Skeen et al. | 395/650 |
| 5,406,557 | 4/1995 | Baudoin | 370/61 |
| 5,440,633 | 8/1995 | Augustine et al. | 380/23 |
| 5,497,319 | 3/1996 | Chong et al. | 364/419.02 |
| 5,524,052 | 6/1996 | Augustine et al. | 380/49 |
| 5,533,116 | 7/1996 | Vesterinen | 379/243 |
| 5,535,120 | 7/1996 | Chong et al. | 364/419.03 |
| 5,557,798 | 9/1996 | Skeen et al. | 395/650 |
| 5,629,978 | 5/1997 | Blumhardt et al. | 379/201 |

OTHER PUBLICATIONS

"The Common Network Management Information Service Element Interfaces", by Modiri et al., Communications, 1991 IEEE International Conference, Mar. 1991, pp. 132–138.

"Netmate: Management of Complex Distributed Networked Systems", by Yemini et al., IEEE, Parallel and Distributed Information Systems, 1991 Int'l Conference, Apr. 1991, p. 173.

"A Protocol Architecture for Integrated Management of Local and Large Networks", by M. Colin and B. Sales, GLOBECOM '93: IEEE Global Telecommunications Conference, 1993, pp. 1548–1552.

"Total Systems Management in Open Architecture Provisioning Systems", by L. Heindel and K. Schlieber, IEEE, Local Computer Networks, 1994 19th Conference, Mar. 1994, pp. 411–416.

Implementaion of the Monitor and Control System for the Caribbean Regional Operations Center (CARIBROC) Communications Network, by J. Reger, IEEE, MILCOM '94, May 1994, pp. 669–673.

"Global Network Management System (GNMS)", by D. Fermaint, IEEE, MILCOM '94, May 1994, pp. 660–663.

"The Integration of OSI Network Management and TCP/IP Internet Management using SNMP", by Park et al., IEEE, Systems Management, 1993 International Workshop, Jun. 1994, pp. 145–154.

Telops Corporate Overview, Telops Management Inc., 1995.

Telops Management Architecture, Telops Management Inc., 1995.

TMNServer Toolkit, Telops Management Inc., 1995.

*Primary Examiner*—Kevin J. Teska
*Assistant Examiner*—Russell W. Frejd
*Attorney, Agent, or Firm*—Fliesler, Dubb, Meyer & Lovejoy

[57] ABSTRACT

A gateway that allows a CMIP/CMISE network manager to manage legacy telecommunications network elements by providing a bidirectional mapping between CMIP messages and legacy syntax messages. The gateway has the ability to understand the individual dialects of each vendor specific legacy syntax; therefore, a single CMIP/CMISE network manager can manage a network composed of a variety of network legacy elements from multiple vendors.

41 Claims, 3 Drawing Sheets

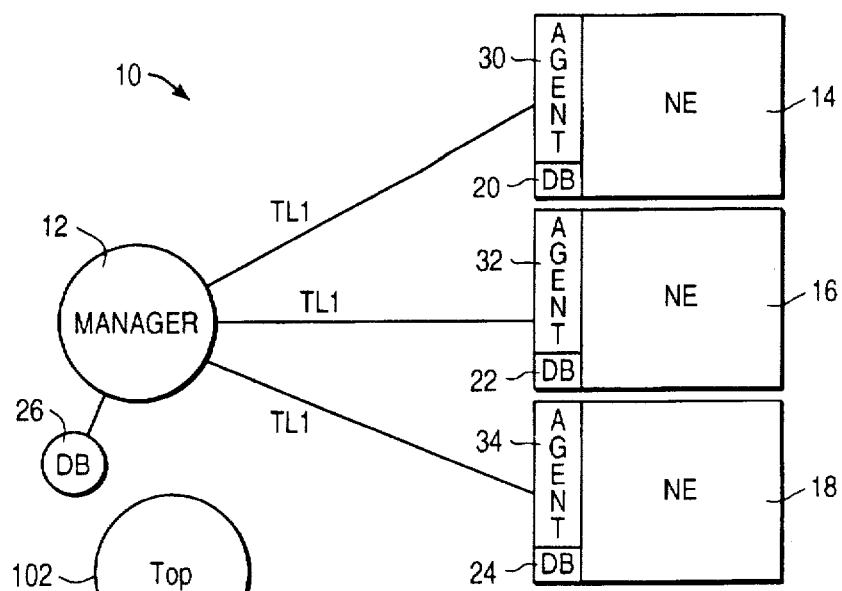
FIG. 1
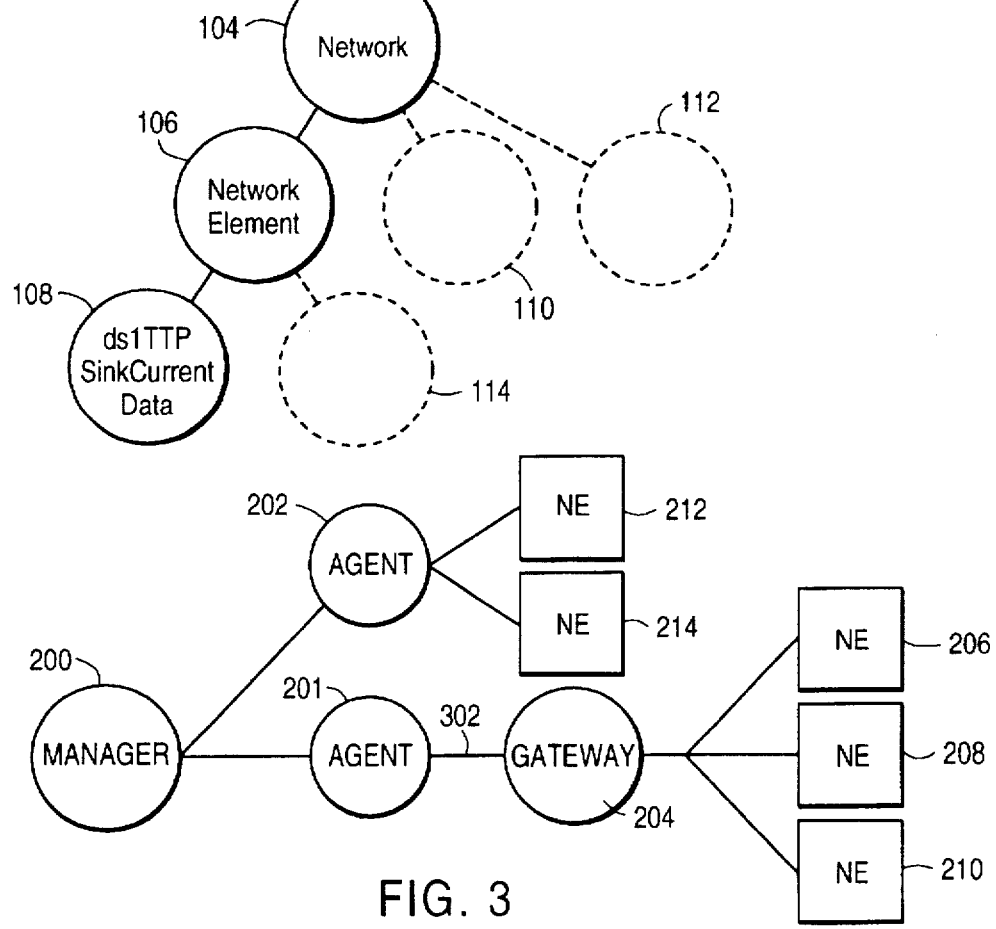
FIG. 2
FIG. 3

GATEWAY FOR USING LEGACY TELECOMMUNICATIONS NETWORK ELEMENT EQUIPMENT WITH A COMMON MANAGEMENT INFORMATION PROTOCOL

COPYRIGHT DISCLAIMER

A portion of the disclosure of this patent document contains material which is subject to copyright protection. The copyright owner has no objection to the facsimile reproduction by anyone of the patent document or the patent disclosure as it appears in the U.S. Patent and Trademark Office patent file or records, but otherwise reserves all copyright rights whatsoever.

BACKGROUND OF THE INVENTION

1. Field of the Invention

The present invention is directed to a gateway that allows a network manager, on a telecommunications network, to manage telecommunication network legacy elements using a Common Management Information Protocol (CMIP).

2. Description of the Related Art

The legacy telecommunications network that has evolved over the last 100 years—predominantly plain old telephone service (POTS) running over copper wire—is undergoing radical change, at least as far as new installations are concerned. The telecommunications industry is undertaking a massive effort to upgrade its infrastructure to take advantage of new broadband technology. The global telecommunications network of the future will be based on several key transmissions, switching and service management technologies which include Synchronous Optical Network (SONET), Asynchronous Transfer Mode (ATM) and Intelligent Networks (IN). SONET is the standard architecture for high speed, high quality optical fiber transmission technology in the United States. SONET is known in Europe as Synchronous Digital Hierarchy (SDH). ATM is a high speed switching and transmission technology that enables voice, video and data tracking to be sent over a single network. ATM offers high quality transmission at very rapid speeds of 155 Mbps and higher. IN is a new approach to developing and deploying information services. IN allows market driven customer applications to be created in real time for only a fraction of the traditional cost. The migration to broadband technology is driven by a growing set of user needs and demands. For example, multimedia, video telephony, imaging, CAD/CAE/CAM, LAN interconnect and interactive television are new applications that require broad bandwidths.

In order to meet the challenge of improving the present telecommunications network, the telecommunications carriers (in the United States this includes the Regional Bell Operating Companies (RBOC's)) are doing more than simply upgrading from copper to fiber transmission equipment. The telecommunications industry has proposed a Telecommunications Management Network (TMN). TMN is envisioned as a network of distributed management services which will provide integrated management of telecommunications networks and services in an open, multi-vendor environment. Over the past several years various standards organizations including the International Telecommunications Union (ITU), the American National Standards Institute (ANSI) and the European Standards Institute (ETSI) have been developing TMN standards. Although these standards are complex and still evolving, the telecommunications carriers are under tremendous pressure to deploy TMN in order to manage their new broadband technology and their existing legacy networks. In order to understand why the telecommunications carriers are adopting new technology and what that technology is, it is necessary to begin by examining how the telecommunications carriers manage their legacy networks today.

A simplified view of how legacy telecommunications networks are managed today is illustrated in FIG. 1. Although, in the real world, a wide variety of telecommunications resources are involved, for purposes of this discussion only two types of resources are of interest: a manager (of which the operations system (OS) is the most prominent) and a telecommunications network element (hereinafter called a network element or NE). A typical network will have many managers and hundreds or thousands of network elements. For illustration purposes only, FIG. 1 shows one manager 12 with three network elements 14, 16 and 18.

Network elements are devices that reside in the telecommunications network itself and their primary job is to handle telecommunications traffic. Network elements are the origin or destination of management supervision and control. One example of a network element is the green box found on the top of telephone poles. In the current telecommunications networks, there are many thousands of network elements in the field from a wide range of vendors. Network elements designed to function in and communicate with legacy telecommunications networks are called legacy network elements. Thus, the network elements 14, 16 and 18 depicted in FIG. 1 are legacy network elements. Each legacy network element is associated with an agent process. Legacy network elements 14, 16 and 18 have agent processes 30, 32 and 34, respectively. The agent processes perform operations on the network elements in response to the manager. Thus, a manager invokes management operations onto an agent to manipulate a legacy network element.

Managers are the supervisory or control systems which are responsible for operations, administration, maintenance and provisioning for the network. Managers are typically located in a central office. Today, each of the RBOCs have roughly 500 managers from a variety of vendors. In the United Sates, managers and legacy network elements communicate using a protocol known as Transaction Language 1 (TL1) which is defined by Bellcore. This language is specific to the North American market. TL1 is a legacy syntax that provides for and messages, but it specifically does not address content. The content of the communications between the manager and the legacy network element is dictated by the content of the databases maintained by each legacy network element. As shown in FIG. 1, each legacy network element includes its own database. For example, legacy network element 14 includes database 20, legacy network element 16 includes database 22 and legacy network element 18 includes database 24. Manager 12 also maintains its own database 26 which contains a superset of all the databases of every legacy network element under its control. Thus, database 26 contains all the information found in databases 20, 22 and 24. In a modern telecommunications network, one manager may manage thousands of network elements; therefore, the database for that particular manager is extremely large, resource intensive and inefficient to maintain.

The legacy network has a number of shortcomings. First, the legacy networks cannot adequately support the new broadband technologies. Second, the legacy network architecture is monolithic as opposed to distributed. Instead of having a management database distributed among an open-ended set of cooperating managers, every manager must be loaded with a massive database containing specific knowledge of every legacy network element under its control. Since there is no way to distribute management control, managers are easily overloaded forcing carriers to install more and more managers to meet peak loads, therefore, increasing the costs of the network. Third, legacy networks are multi-vendor networks but no standards or other provisions have been employed to insure interoperability. So the addition of each new vendor expands manager database 26 and the overall management burden exponentially. Maintenance workers must be trained on and equipped to use a wide variety of vendor specific tools. Testing for problems involving equipment from more than one vendor is problematic because the test tools from one vendor will not managing legacy network elements. Instead, each vendor provides tools that can be used only with their network legacy element.

To solve these problems, TMN, employs the basic concept of providing an organized architecture to achieve the interconnection between various managers and network elements for the exchange of management information using an agreed architecture with a standardized interface and protocol. Only one protocol is used to communicate with any particular network element. The manager does not know of any differences between the various network elements. For example, in the legacy network of FIG. 1 the manager has a different protocol for communicating with each legacy network element. In TMN, the manager would not need as large of a large database because there is only one protocol for communicating with all of the network elements. Instead of having an agent at every single network element, there could be one agent for hundreds of network elements and a manager could talk to one agent for a number of network elements. This type of solution allows management functions to be decentralized. One manager can manage a diverse equipment using generic information models and standard interfaces, thereby, reducing software and maintenance costs.

Wherever possible, TMN uses the Open Systems Interconnect (OSI) systems management standards which utilizes object-oriented, application-layer building blocks including the Common Management Information Service Element (CMISE). CMISE includes a protocol definition and specification known as the Common Management Information Protocol (CMIP).

Although TMN provides a solution to the shortcomings of the legacy telecommunications network, the telecommunications industry is faced with the classic dilemma of what to do about its installed base, the legacy equipment. Despite the promise of broadband and TMN technology, the world still runs on billions of dollars of legacy equipment and it is not economically feasible to abandon the legacy equipment, nor technically feasible to instantly transform the telecommunications networks to TMN. Thus, the telecommunications carriers will not move to TMN if they have to abruptly abandon the legacy equipment.

Instead the carriers desire a seamless transition from legacy equipment to broadband technology. This means an initial deployment of broadband technology that interoperates with the legacy network element. However, the new managers that are designed to communicate using CMIP are not able to communicate with legacy network elements which understand TL1 or some other legacy syntax. A legacy syntax is defined as the language or protocol used for communication by a legacy network element. New managers employing the TMN technology, therefore, cannot be installed into an existing legacy network. Thus, there is an urgent need for some means for allowing a manager, which communicates using CMIP, to manage a large number of legacy network elements, where each of the legacy network elements communicate in a different legacy syntax or different dialect of the same legacy syntax (e.g. TL1).

SUMMARY OF THE INVENTION

The present invention is directed to overcome the disadvantages of the prior art. Thus, the present invention, roughly described, provides for a gateway for use with a source of network management messages provided in a first syntax and a plurality of network elements adapted to respond to network management messages provided in respective syntaxes different from said first syntax. The gateway includes a mapper which has a command module and a response module. The command module receives a first syntax command from the source identifying a particular one of said network elements, selects a dictionary from a plurality of dictionaries in response to the network element identification and maps the first syntax command into at least one second syntax command. The said second syntax being the respective syntax for the identified network element. The response module receives a second syntax response, selects the dictionary and maps the second syntax response to a first syntax response. In one embodiment, the source is a network manager.

One embodiment of the present invention gateway includes a queue. The command module queues state information about the first syntax command and the second syntax command. The response module accesses the queue after receiving the second syntax response.

Other embodiments can include an initialization module for setting configuration data, and an intelligent alarm filter for selectively filtering alarms received by the gateway from network elements so that a selected first subset of alarms are passed to the mapper and a second set of alarms are not passed to the mapper. A user interface can also be included that allows a user to enter configuration information about network elements, send messages to the network legacy elements and view alarms. An embodiment of the gateway can also include a command generator and a response handler, both in communication with the mapper. The command generator forwards the second syntax commands to the network elements. The response handler receives second syntax responses from the network elements and communicates the second syntax responses to the mapper.

A gateway according to the present invention receives a first message from the source. The first message being in a first syntax and identifying a particular one of the network elements. The gateway selects a dictionary from a plurality of dictionaries in response to the identification of the network element, maps the first message into at least a second message in response to the selected dictionary, and transmits the second message to the identified network element. The second message is in the respective element syntax associated with the identified network element.

In the United States, the most common respective element syntax (also called a legacy syntax) is TL1. Many different dialects of TL1 exist. One embodiment of the present invention is designed to work with many dialects of TL1 and any other legacy syntax. The gateway described above will allow carriers to begin moving to the new broadband technology (e.g. TMN) while still using existing legacy equipment.

A gateway according to the present invention can be a computer program and/or can include a programmed general purpose computer, a specifically designed computer, a specifically designed or programmed circuit board, an integrated circuit or a combination of hardware components designed to operate as described below. If the implementation of the present invention includes a computer program, the program can be stored on any known storage medium including, but not limited to, a floppy disk, a hard disk, CD-ROM and memory.

These and other objects and advantages of the invention will appear more clearly from the following detailed description in which the preferred embodiment of the invention has been set forth in conjunction with the drawings.

BRIEF DESCRIPTION OF THE DRAWINGS

FIG. 1 is a simplified block diagram of a legacy telecommunications network.

FIG. 2 is an example inheritance tree for managed object classes.

FIG. 3 is a simplified block diagram of a telecommunications network utilizing CMIP and the gateway of the present invention.

DETAILED DESCRIPTION

I. Transactional Language 1

Figure 4:
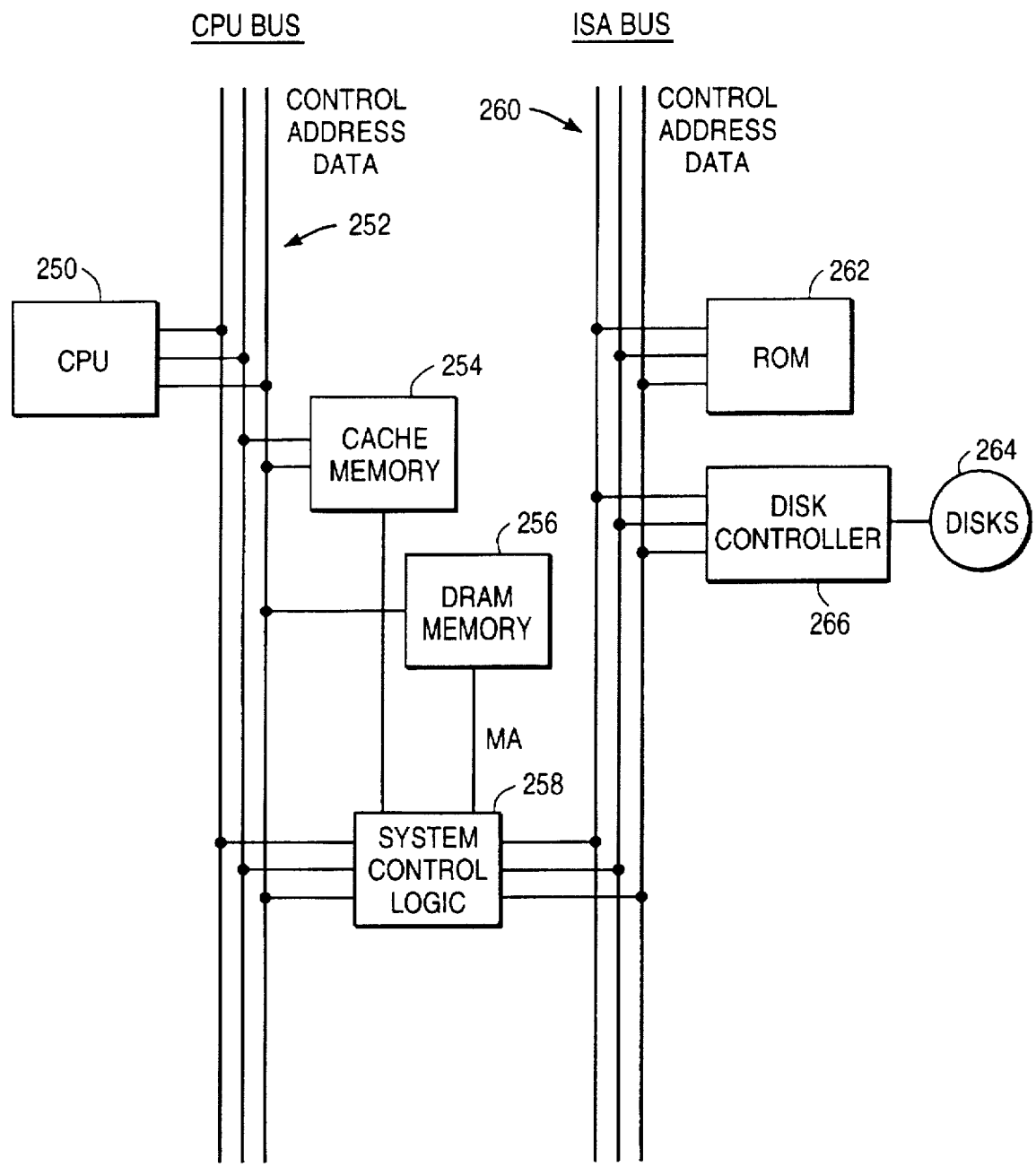
FIG. 4 is a block diagram of one exemplar hardware architecture that can be used to practice the present invention.

Transaction Language 1 (TL1) is a transactional language used for the messages that pass between a manager and a network element. Each TL1 message is expressed in American Standard Code for Information Interchange (ASCII) characters. TL1 specifies four types of messages: commands, acknowledgements, responses and autonomous messages. A command is a message from the manager or other source to a network element that requests the network element to perform some operations-related action. The general structure of a TL1 command is of the form:

<command code>:<staging parameter blocks>:<message payload block(s)>;

The <command code> determines the action to be taken at the legacy network element. The <command code> includes a verb and up to two modifiers. An example of a TL1 verb is RTVR, which means retrieve. Two examples of modifiers are PM which means performance monitoring and T1 which means Transmission Entity 1. Thus, the <command code> RTRV-PM-T1 signifies that the manager wants to retrieve some performance monitoring value from Transmission Entity 1. The <staging parameter blocks> determine the target legacy network element and the identity of the object to be acted upon by the input command. The <staging performance blocks> include an AID, a TID and a CTAG, all three of which will be described below. The <message payload block(s)> is the subject matter relating to the action to be performed by the input message. The semi-colon character (;), terminates a TL1 command.

An acknowledgement is a short reply from the network element indicating that a command message is being acted upon or has been immediately rejected. The essential purpose of an acknowledgement is to reassure a human user that a command which takes a long time to execute has been received by the network element. The format of an acknowledgement is as follows:

<acknowledgement code>^<ctag><cr><lf><

The <acknowledgement code> identifies the reason for the acknowledgement. The <ctag> identifies the associated input command. The less than (<) character is the acknowledgement terminator.

A response is a detailed reply (or set of replies) to a command which contains information indicating whether the command was executed successfully and any data that needs to be returned to the manager. The general structure of a TL1 response message is of the form:

<header> <response identification>|<text block>] <terminator>

The <header> represents information common to all response messages; i.e., it is independent of the type of response. The <response identification> identifies the type of output response. The <text block> represents information specific to the particular response. This component is optional. The <terminator> indicates the termination of the output response message.

An autonomous message is a message generated by the network element either on a periodic time basis or to report some unusual occurrence. An example of an autonomous message is an alarm which is a message that indicates a state of a managed object on a network. The general structure of a TL1 autonomous message is:

<header><auto id>[<text block>]<terminator>

The <header> represents information common to all autonomous messages. The <auto id> identifies the severity and the nature of the autonomous message. The severity is indicated through the use of an alarm code. The <text block> represents information specific to the particular autonomous message. This entry is optional. The <terminator> indicates the completion or continuation of the autonomous message.

For more information on TL1, see Operations Application Messages Language For Operations Application Messages (A Module of OTGR, FRNWT-000439), Operations Technology Generic Requirements, Bellcore, Technical Reference TR-NWT-000831, Issue 3, July 1993, Section 12.1 of OTGR.

II. Common Management Interface Protocol (CMIP)

CMIP is a standard protocol that enables a managing process to communicate with a network resource (e.g. a network element) without knowing the specific architecture and implementation of the network resource. That is, all network elements would look the same to a manager using CMIP. The following section describes the theory, foundation and basic structure of CMIP.

A desired management environment is composed of two or more cooperating open systems. This cooperation in the telecommunications network environment is aimed at the monitoring and control of resources. The resources may include equipment, line cards, circuits, lines, logs, etc. The resources are uniformly represented in the open systems as managed objects, which is a logical representation of the management view of a resource. The cooperation is achieved through management exchanges using OSI protocols (e.g. CMIP).

Systems management is a distributed application that permits managing processes to monitor and control resources within a managed system through an agent process. For example, in FIG. 1, managing process 12 manages legacy network elements 14, 16, 18 through agents 30, 32 and 34, respectively. The managing process invokes operations such as a create object which is the operation of creating an instance of an object in the representation of the network. These operations are then performed by the agent process on the managed objects. The agent process may forward notifications, such as alarms or state changes, generated by the managed objects back to managing processes.

The agent process controls the real resources using local interfaces and makes the management view of the resources visible to the managing process as a set of managed objects. Such a logical view is termed Management Information Base (MIB). In effect, the managing process does not see the real resources, but only the representation of the management view of the resources in the MIB. The managing process "manages" the resources by manipulating (essentially reading and modifying) the MIB through the agent process. The agent process performs management operations evoked by the managing process onto the main and support resources, and forwards notifications emitted by the resource to the managing process.

The management view of the resources in the MIB is accomplished using object oriented standardized managed object classes that can be instantiated. A managed object class represents the manager's view of a collection of managed objects with similar characteristics. A managed object can be described in terms of its attributes, notifications and operations. Attributes include object class, operational state, usage state, and administrative state, as well as others. Notifications include messages indicating that a managed object is disabled, is undergoing a state change or a threshold has been exceeded. Operations that can be performed on the object itself include reading an attribute, setting an attribute, suspending an object, resuming and initializing.

Consider, for example, a green box on the top of a telephone pole. The normal view of the green box is that seen by its users, namely the services it can provide. The management view, the view of the green box as seen by the managing process, can be described informally, and at a high level, by listing (1) the attributes of the green box, (2) the operations that can be performed on it by a manager and (3) the notifications the green box may emit to the manager. Given a definition of such a managed object class, the class can be instantiated to describe instances of such equipment. Each instance of a managed class is termed a managed object. This information model plays a major role in unifying management practices.

In most cases, a new managed object class can be derived from existing managed object classes, where the new class inherits all the attributes, operations and notifications of the parent class. This inheritance property exploits the commonality among managed object classes and facilitates upward compatibility. Thus, a database of managed objects would form an object oriented inheritance tree. An example of an object oriented inheritance tree is depicted in FIG. 2 which shows a top class 102 at the top of the tree. Below top class 102 is network class 104. Below network class 104 is network element class 106. Below network element class 106 is ds1TTPSinkCurrentData class 108 which defines a line card in a telephone network. Below network class 104 and network element class 106 are dotted circles 110, 112 and 114. These doted circles are drawn to represent that a real inheritance tree is likely to have many classes to each level. However, for example purposes, only one class at each level will be discussed.

To facilitate upward compatibility, it is desirable for some managed objects to emulate parent object classes. For example, in the inheritance tree of FIG. 2 ds1TTPSinkCurrentData class 108 would derive from the network element class 106 and inherit all the attributes, operations and notifications of network element class 106. Since ds1TTPSinkCurrentData class 108 includes all of the attributes, operations and notifications of network element class 106, a ds1TTPSinkCurrentData managed object can emulate a network element managed object. This enables a manager who cannot manage ds1TTPSinkCurrentData objects but can manage network element objects to manage a ds1TTPSinkCurrentData object.

Every object in the inheritance tree has a relative distinguished name (RDN) attribute that identifies the object within the scope of the inheritance tree. The RDN is expressed as an attribute value assertion. For example, the RDN of an instance of the ds1TTPSinkCurrentData class 108 may be as follows:

{ds1TTPSinkCurrentData Id="dsline1"}

The distinguished name (DN) of an object comprises the sequence of RDNs from the top of the inheritance tree down to the managed object itself. For example, the DN of an instance of ds1TTPSinkCurrentData class 108 may be as follows:

{network Id="engineering", network elementId= "Oasys1", ds1TTPSinkCurrentData Id="dsline1"}

The above instance suggests that the ds1TTPSinkCurrentData line card whose local name is "dsline1" is contained in a network element whose name is "Oasys1" which is within a network labelled "engineering."

To permit slight variations of characteristics within the same object class it is useful to organize a class definition in terms of mandatory and optional "packages" of attributes, notifications and actions. This notion for defining managed object classes is described by the standardized Guidelines for the Definition of Managed Objects (GDMO). GDMO employs several ASN.1 "templates" that enable the designer of a managed object class to formally describe a particular class. Each template is used to specify certain aspects of a class using ASN.1.

Nine templates are specified by GDMO: Managed Object Class template, Package template, Behavior template, Attribute template, Notification template, Action template, Name Binding template, Attribute Group template and Parameter template. The Managed Object Class template is used to specify a managed object class by listing the names of the parent class (or classes) and names of the mandatory and conditional packages. The Package template is used to describe a package by listing the name of its behavior, and the names of its attributes, notifications, and actions. For every attribute name the qualifier GET or GET-REPLACE is used to indicate if the attribute is read only. For multi-valued attributes, the qualifier ADD or ADD-REMOVE is needed. The Behavior template is used to document the behavior of an object, such as under what circumstances notifications are sent. The Attribute template is used to specify the attribute syntax. If the object class is to be instantiated then at least one attribute is a local name (RDN) of the object. The Notification template is used to specify the syntax of the notification and indicates if the notification mode is CONFIRMED or NON-CONFIRMED. The Action template is used to specify the syntax of the action information and indicates whether the node is CONFIRMED or NON-CONFIRMED. The Name Binding template is used to define a naming structure by identifying the superior (containing) object. The Attribute Group template is used to list the names of attributes that belong to an attribute group. The Parameter template is used to specify the syntax of parameters associated with the attributes, notifications and actions within a package.

Because a managed object is described in terms of attributes, notifications and actions, the management exchanges will also relate to attributes, notifications and actions. Therefore, a common protocol capable of manipulating attributes and conveying the actions and notifications can be used. That protocol is CMIP. All management functions employ the same generic CMIP platform to convey management information.

CMIP defines a number of management services which enable (1) a managing process to invoke management operations onto an agent process to manipulate managed objects and (2) an agent process to invoke notifications onto a managing process. The CMIP services are depicted in Table 1.

TABLE 1

| Commands | Direction |
| --- | --- |
| EVENT-REPORT | Agent to Manager |
| GET | Manager to Agent |
| SET | Manager to Agent |
| ACTION | Manager to Agent |
| CREATE | Manager to Agent |
| DELETE | Manager to Agent |
| CANCEL-GET | Manager to Agent |

The majority of the services can operate in an asynchronous fashion. That is, the invoker of a service need not wait for a reply before invoking another service. In order to correlate replies with invocations an identifier (also called a CMIP reference number) is used for every service. All services except the M-CANCEL-GET are concerned with managed objects and, therefore, need to reference managed objects. A managed object is selected by identifying its class and its instance name (or DN). A scoping parameter may be employed in some of the manager initiated services to enable multiple objects to be selected for the performance of the management operation. For example, GET the operational state of all line cards within a particular green box. When scoping is used, each result concerning a single managed object is returned as a linked reply to the service that caused the multiple replies to be returned. Each linked reply conveys a linked identifier, which has the same value as the invoke identifier of the operation that caused the multiple replies. Once all the replies are returned, a terminating response is returned.

The EVENT-REPORT command permits the agent process to send a notification originated by a managed object to the manager. The GET command permits the managing process to retrieve one or more attributes from one or more managed objects. The SET command permits the managing process to modify one or more attributes in one or more managed objects. The ACTION command permits the managing process to perform an action on one or more managed objects. The CREATE command permits the managing process to create a single managed object in the MIB (remember that a managed object is representation in the MIB of the management view of a real resource). Note that when an object is created its containing (superior) object must be identified so that the object can be inserted into the appropriate place in the MIB. The DELETE command is a reverse of the CREATE command. It permits the managing process to delete one or more managed objects from the MIB. Finally, the CANCEL-GET command enables the managing process to cancel a previously invoked GET that caused multiple replies to be returned.

Every managed object that represents a functional resource experiences at least three categories of states in the course of its use: operational states, usage states and administrative states. The operational states describe the ability of a resource to operate. Two operational states are defined that can be read, but not modified, by a manager. The "disabled state" indicates that the resource represented by the managed object is not functional from the operational point of view (e.g. not powered or not connected). The "enabled state" indicates that the resource is operationally capable of supporting users, but no users are attached.

The usage states describe the useability of a resource. Three states are defined that can be read, but not modified, by a manager. The "idle state" indicates that the resource is not currently being used. The "active state" indicates that at least one user is using the resource and that the resource has the capacity to support more users. The "busy state" indicates that the resource is active but has no capacity to support further users. For example, a green box is "idle" when it is "enabled" but no users are attached. The green box is "active" when at least one user is attached and "busy" when no more users can be attached. A single user telephone does not experience an "active" state. The telephone is "idle" when it is "enabled" but no user attached and "busy" when a user is talking on the telephone.

The administrative states describe permission to use a resource. Three states are defined that can be both read and modified by a manager. The "locked" state indicates that the resource is locked from the administrative point of view and, therefore, no user may access the resource. The "unlocked" state indicates that the resource is open from the administrative point of view and that users may access the resource. Finally, the "shutting down" state indicates that the resource is not open for new users but existing users may continue to use the resource until they are done, at which time the administrative state will change from "shutting down" to "locked." The operational, usage and administrative states can be read by invoking the services of the GET command.

One of the most frequently invoked management activities across the managing-agent interface is passive alarm reporting. The alarm reporting function defines a mechanism for the reporting of alarms and related information. Each notification is conveyed to the EVENT-REPORT service. Five alarm notifications are defined. Each alarm notification conveys a number of parameters. The "communications alarm" is concerned with the communications related problem. The "processing alarm" is concerned with a software or processor problem. The "equipment alarm" is concerned with 5 faulty equipment. The "environmental alarm" indicates an enclosure problem.

Fourteen event information parameters are defined covering a number of aspects of possible situations. The "probable cause" parameter indicates the probable cause of the alarm, such as adaptor error, bandwidth reduced, call establishment error, communications protocol error, congestion, fire detected or flow detected. The "specific problems" parameter identifies additional information related to the probable cause parameter. The "perceived severity" parameter defines six levels of alarm severity: cleared, indeterminant, critical, major, minor and warning. The "backed up status" parameter identifies whether the object that caused the alarm is backed up by a back-up object. The "back-up object" parameter identifies the object that backs up the object that caused the alarm. The "trend indication" parameter specifies the current severity of the alarm: more severe, no change or less severe. The "threshold information" parameter is used when the alarm is the result of crossing a threshold. It identifies the following: triggered threshold, threshold level, observed value, and time when the threshold was alarmed. The "notification identifier" parameter is used to correlate notifications. The "correlated notifications" parameter is a set of notifications identifiers. The "state change" parameter indicates a state transition (if any) in the object that caused the alarm. The "moderate attributes" parameter defines those attributes and attribute values that are under surveillance when the alarm occurred. The "proposed repair actions" parameter suggests one or more solutions if the cause off the alarm is known and the suggestions can be made. The "additional text" parameter permits a free form text to be included in the alarm. Finally, the "additional information" parameter allows the inclusion of additional information in the alarm report.

III. The Gateway

A. System Overview

FIG. 3 shows an exemplar telecommunication network which includes a manager 200, which communicates using CMIP, and a variety of network elements, some of the network elements communicate using CMIP and other network elements using a legacy syntax (e.g. TL1). Typically, a network will have tens of thousands of network elements. The network may be divided up into subsets where one agent will be used to interface with many network elements. The agent knows which elements it is interfacing with. Thus, when a manager sends a message to a network element, the agent interfacing with the network element will receive the message and take the appropriate actions with the network element. For example purposes, FIG. 3 shows agent 201 interfacing with legacy network elements 206, 208 and 210. Agent 202 is interfacing with network elements 212 and 214, both of which communicate using CMIP. Alternative networks could include one agent talking to both CMIP network elements and legacy network elements. Any number of network elements can be interfaced with one or more agents. When manager 200 needs to perform a managerial task on network elements 212 or 214, a CMIP message is sent to agent 202. When manager 200 needs to perform a managerial task on network elements 206, 208 and 210, a CMIP message is sent to agent 201. Agent 201 receives a CMIP message from manager 200 and sends a message to gateway 204 which includes CMIP syntax. Gateway 204 maps the CMIP information to legacy syntax messages and forwards the legacy syntax messages to the appropriate network element (e.g. 206, 208 or 210).

FIG. 4 is a symbolic block diagram of one exemplar hardware architecture that can be used to practice the present invention. The hardware comprises a CPU 250, which may be an Intel 80486 compatible CPU or an Inter Pentium processor, for example. CPU 250 has address, data and control lines which are connected to CPU bus 252. CPU bus 252 is also connected to a cache memory 254 and to DRAM memory 256, both of which are controlled by system control logic 258. System control logic 258 is connected to CPU bus 252 and also to control, address and data lines of an ISA bus 260. Connected to ISA bus 260 is ROM 262, which contains the system BIOS, and a disk controller 266 for floppy and hard-disk drives 264. The system of FIG. 4 can be connected to a telephone network in various configurations known in the art. The system of FIG. 4 illustrates only one platform which can run software according to the present invention. Numerous other platforms can also suffice, such as Macintosh-based platforms available from Apple Computer, Inc., platforms with different local bus configurations, networked platforms, multi-processor platforms, and so on.

Figure 5:
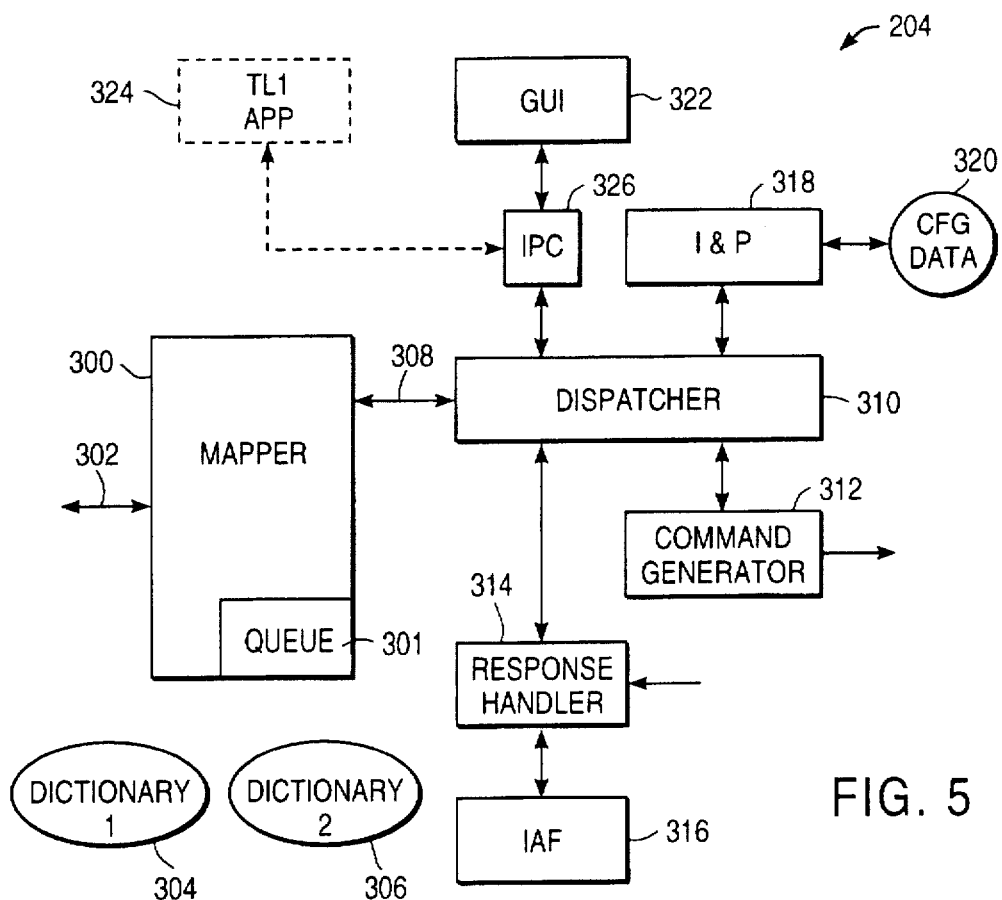
FIG. 5 is a block diagram of the gateway of the present invention.

FIG. 5 is a block diagram of the architecture of gateway 204. Mapper 300 provides the logic to translate CMIP messages to and from the legacy messages (e.g. TL1). Dictionaries (e.g. dictionary 304 and dictionary 306) are loaded for each vendor's command set. That is, if one company has one particular legacy syntax for its network element and another company has a second legacy syntax for its network element, the gateway would include two dictionaries. Realistically, there are many different types of network elements; therefore, the gateway is likely to include many different dictionaries. The gateway of the present invention can be used to translate between CMIP and any legacy syntax. However, for example purposes only, the remainder of the detailed description will be focussed on translating between CMIP and TL1.

Mapper 300 accepts an interprocess message from agent 201 (symbolically shown with bidirectional arrow 302) and TL1 messages from response handler 314. Mapper 300 uses attributes, object class, action syntax and notification syntax for translating to and from the legacy syntax, TL1. Mapper 300 sends legacy syntax messages (shown symbolically by bidirectional arrow 308) to a command generator 312 via dispatcher 310. Command generator 312 forwards messages to a device driver. As will be explained later, command generator 312 can also read TL1 commands from the legacy syntax application interface, check or verify the syntax of the TL1 commands and forward the commands to a device driver (not shown) for transmission to the legacy network element. Response handler 314 accepts TL1 messages from the legacy network element and returns them to mapper 300 via dispatcher 310. Response handler 314 also passes alarm information to intelligent alarm filter 316. Intelligent alarm filter 316 categorizes and logs incoming alarms so that only a subset of alarms are passed to mapper 300. Intelligent alarm filter 316 may also include a graphic user interface.

Initialization and provision service 318 is used to acquire and manage configuration information which is stored in CFG DATA 320, a configuration database. Configuration information is required to initialize sessions with each legacy network element. Configuration information includes the target identifier (TID), personal identifier (PID), user identifier (UID), activation scenario, manufacturer, model and failure scenarios. The manufacturer and model information is used to select the proper dictionary. The TID is a network element identification used to uniquely identify every network element. The UID identifies all entities which may access the network element identified by the TID. The PID is a password used for security purposes by the entity identified in the UID. The activation scenario is a series of tasks to be performed when a network element is to become active on the network and establish a session with gateway 204. Failure scenarios are provided to handle recovery for a variety of legacy equipment and network failures.

The initialization and provision service is provided through a graphic user interface 322 which communicates to initialization and provision service 318 via dispatcher 310 using interprocess control 326. Interprocess control 326 is a standard IPC mechanism that exists on the platform supporting gateway 204. Dispatcher 310 routes interprocess communication and assures nonblocking.

B. Initialization and Provisioning

Initialization and provision module 318 is typically the first function executed within the gateway. Its purpose is to establish a session between the gateway and a legacy network element as well as set up configuration information relative to each legacy network element for the maintenance of each session. In addition, it also directs mapper 300 as to which dictionary to use for each legacy network element based on the TID. In the preferred embodiment, a user accesses the initialization and provision module through graphic user interface 322. The graphic user interface 322 interacts with initialization and provision module 318 by calling the functions described below. However, alternative embodiments can use other processes to communicate to the initialization and provision module 318.

When manager 200 establishes a connection with agent 201, manager 200 is ready to receive notifications from agent 201. When agent 201 binds to gateway 204, because gateway 204 has already established session with the legacy network elements (206, 208 and 210), alarms can be interpreted and directed to manager 200 from the legacy network element.

Another item of configuration information is the heartbeat timer and scenario. Every time the heartbeat timer expires the heartbeat scenario is executed for the target legacy network element. If gateway 204 does not receive a response from the heartbeat scenario, the legacy network element is considered to have a link (or node) failure. When a link failure occurs a link node failure scenario is executed. If there is still no response, the network element is considered out of service. A gateway retry timer allows the link failure scenario to be executed periodically for network elements that are out of service. When a legacy network element comes back on line, it is removed from the out of service list.

The structure definition used by the initialization and provisioning module 318 and contained for each legacy network element in CFG DATA 320 is:

```
struct LNEdata
{
    char        tid[21];
    char        pid[11];
    char        uid[11];
    char        init_scenario[128];
    char        hbeat_scenario[128];
    char        lnfail_scenario[128];
    char        manufacturer[25];
    char        model[25];
    char    .   release[6];
    char        ip_address[16];
    int         hb_timer;
    int         lf_timer;
    int         disable_svc_flag;
}
```

TID/PID/UID are used to identify a legacy network element. The field "init_scenario" is the activation scenario. The field "hbeat_scenario" is the heartbeat scenario which is executed periodically. The field "lnfail_scenario" is link node failure scenario that is issued periodically when a legacy network element is detected to be inactive or out of service. This scenario is repeated until a response is received indicating that the network element or node is once again active. This may be a repeat of the initialization scenario. Manufacturer name, model and release number are used to form association between each legacy network and the proper dictionary. The field "hb_timer" is a decimal number between one and 60, measured in minutes, which indicates each time interval for the gateway to transmit the heartbeat scenario and wait for a response. The field "lf_timer" is a decimal number between one and 60 as measured in minutes which indicates the time interval for the gateway to transmit the link node failure scenario and wait for a response. "Disable_svc_flag" is checked every thirty seconds for non-zero value. If the contents are non-zero, the legacy network element is removed from service by the gateway and the link/node failure scenario is activated until the element is available and the disabled service flag is reset to zero.

The information described above is placed in CFG DATA 320 and accessed by initialization and provision module 318 for use during system start up and thereafter. During initialization, the proper information is filled in the above defined structure. This is called configuration. After a legacy network element is configured, a session can be started between the legacy networks element and the gateway.

The function call interface to initialization and provision module 318 includes at least four functions: TL1GWSetCfg( ); TL1GWGetCfg( ); TL1GWDelCfg( ) and TL1GWGetTIfDS( ). The TL1GWSetCfg( ) function sets the configuration information for a legacy network element. When this function is called, a pointer to the configuration information for one legacy network element must be passed. If a new legacy network element is added to CFG DATA 320 after system start up, the initialization provision module 318 executes its activation scenario and adds it to the list of active legacy network elements. If a legacy network element as identified by its TID was previously configured, the new information would be considered current and would override the old information. Only one set of configuration information is kept per legacy network element.

The TL1GWGetCfg( ) function is used to retrieve or get previously configured information for a legacy network element. The function call has two input parameters: the TID of the legacy network element and a pointer to a configuration information structure which is filled in for the legacy network element upon return.

The TL1GWDelCfg( ) function call is used to remove previously configured information for a legacy network element. The TID is a required input parameter. The TL1GWGetTIDS( ) function call returns a list of all TADS that have been previously configured by initialization and provision module 318.

C. Legacy Syntax Application Interface

The legacy syntax application interface allows an application (e.g. TL1 application 324) or a user using graphic user interface 322 to send legacy syntax messages and receive legacy syntax messages. Looking at FIG. 5, the legacy syntax application interface is an interface for TL1 application 324 and GUI 322 to use command generator 312 and response handler 314. In the preferred embodiment, TL1 commands, acknowledgements responses and autonomous messages are displayed as ACII strings. These strings are easily transferred as a sequence of octets across the IPC mechanism 326. TL1 application 324 can be a program other than a manager (for example software or hardware used for maintenance) that needs to communicate with a legacy network element.

The following structure represents a TL1 message that is sent and received across the legacy syntax application interface and IPC 326:

```
typedef struct {
    unsigned int     EventCode;
    unsigned int     ErrorCode;
    unsigned int     UserId;
    void             *pMsgInternal;
    int              OmitSyntaxChecking;
    unsigned int     nTL1Bytes;
    unsigned char    TL1Bytes[];
} tl1_t, *ptl1_t;
```

The fields in the tl1_t structure are detailed below.

| | |
|---|---|
| EventCode | The event code indicates the message type. The EventCodes that the user sees are TL1COMMAND or TL1RESPONSE. Internally two additional EventCodes are used, which are TL1REGISTRATION and TL1CLOSE. |
| ErrorCode | The error code is used in response messages to indicate SUCCESS, FAILURE, NOMSG, ALREADYOPEN, or BADSYNTAX. |
| UserId | This command identification is available for use by the client (e.g. TL1 application 324). The client can use it to map responses to requests or keep state information. The legacy syntax application interface maintains its value, but does not use it. |
| pMsgInternal | Interprocess communications module 326 uses this value when multiple clients are running to identifying the return mailbox path. |
| OmitSyntaxChecking | Normally command generator performs syntax checking and will reject, prior to transmission, a TL1 command that is invalid according to the TL1 syntax. However, by setting this field to 1, the TL1 command can be forced to be issued. |
| nTL1Bytes | The number of octets in the stream representing the TL1 command or TL1 response. |
| TL1Bytes | The variable length string of octets representing the TL1 command or TL1 response. |

When graphic user interface 332 or TL1 application 324 send a TL1 command, the EventCode field of the structure is set to TL1COMMAND. nTL1Bytes field of the tl1_t structure is set to the number of octets in the command that follows. TL1Bytes is an octets string representing a TL1 command. No response message is required to be returned from the interface. Responses will depend on the TL1 command itself, that is, whether the command issued generates a response from the target network element. If the TL1 command does not pass syntax checking, gateway will send a response message with BADSYNTAX in the error code field. A FAILURE in the ErrorCode field indicates an error in the process of transferring the message through the gateway, but does not indicate an error at the legacy network element. Errors at the legacy network element are reported in the TL1 response message.

When the graphic user interface 322 or the TL1 application 324 receive a TL1 response the EventCode field of the tl1_t structure is returned as TL1RESPONSE. The ErrorCode field of the tl1_t structure is returned as either SUCCESS, FAILURE, NOMSG or BADSYNTAX. The nTL1Bytes field of the tl1_t structure indicates a number of octets that follow. The field TL1Bytes stores the octets representing a syntax message or TL1 response.

The function calls that make up the legacy syntax application interface are: TL1Bind( ), TL1Send( ), TL1Receive( ), and TL1Unbind( ). TL1Bind( ) must be called first; TL1Send( ) and TL1Receive( ) are called during the life of a TL1 application; and TL1Unbind( ) is called at the end of a session.

The TL1Bind( ) function is called by the legacy syntax application interface user to bind to gateway 204, it opens the interface in both directions. The TL1Send( ) function is called to send a TL1 command to gateway 204. TL1 application 324 should know how to format a TL1 command. The TL1Receive( ) function is called to check if there are any TL1 response messages available from gateway 204. When a message is available, TL1 application 324 will receive a pointer to the TL1 response message, which is of variable length. When a TL1 command fails syntax checking, the TL1Receive( ) function will return the gateway explanatory message to the application. When no message is available, the TL1Receive( ) function will return NOMSG. This allows for a non-blocking check of the incoming mailbox. When the return code is NOMSG, the values of the returned parameters will be unchanged.

The TL1Unbind( ) function is called to close the session with gateway 204. It closes the interface in both directions between the TL1 application 324 and gateway 204. Autonomous messages or alarms will no longer be routed to the TL1 API user.

D. Mapper

When manager 200 sends a CMIP message to a legacy network element, the CMIP message is first received by agent 201. After receiving the message, agent 201 sends a message to gateway 204 which includes the relevant CMIP information. Agent 201 sends this message to gateway 204 by making one or more function calls to mapper 300. The invoking of the mapper functions involves the passing of the CMIP data to the mapper which then provides the logic to translate the CMIP message to one or more legacy syntax messages. The following structure represents the mapper 300 message that is sent and received across an interprocess communications mechanism between agent 202 (FIG. 3) and mapper 300 (FIG. 5):

```
class MapperMessage {
        unsigned int       EventCode;
        unsigned int       ErrorCode;
        unsigned int       UserId;
        void               *pMsgInternal;
        unsigned int       nMessageBytes;
        unsigned int       CommandType;
        unsigned char      ManagedElementId[];
        unsigned char      ObjectClassName[];
        unsigned int       nNamingAttributes;
        unsigned char      NamingAttributeValue[];
        unsigned int       ScopingCode;
        unsigned int       nAttributes;
        ValueStruct        Attributes[];
} mapr_t, *pmapr_t;
struct ValueStruct {
        unsigned int       SyntaxType;
        unsigned char      AttributeName[];
        unsigned int       AttributeLength;
        unsigned char      AttributeValue[];
};
```

The fields in the mapr_t structure are detailed below.

| | |
|---|---|
| EventCode | The event code indicates the message type for each request and response. The possible EventCodes are MAPRREGISTRATION, MAPRCOMMAND, MAPRCLOSE, and MAPRRESPONSE. |
| ErrorCode | The error code is used in response messages to indicate SUCCESS, FAILURE, NOMSG, ALREADYOPEN, or BADSYNTAX. Mapper translation errors may occur such as NOMODTRANSLATION, NOAIDTRANSLATION, NOATTRTRANSLATION, NOVALUETRANSLATION, or TRANSLATIONERROR. |
| UserId | This command identification is available for use by the client (agent 201). The client can use it to map responses to requests or keep state information. |
| pMsgInternal | An interprocess communications module uses this value when multiple mapper clients are trying to identifying the return mailbox path. |
| nMessageBytes | The number of octets in the stream representing the total message that follows. |
| CommandType | Indicates the type of CMIP request. Possible values are CREATE, GET, CANCEL-GET, SET, ACTION, NOTIFICATION, DELETE. |

| | |
|---|---|
| ManagedElementId | This value identifies the system in the network being managed and is the value of the naming attribute for the managed element object class. This value is used to specify the TID. |
| ObjectClass Name | The object class gives more detail on the area of information required, and generally allows translation into the TL1 command verb modifiers. |
| nNamingAttributes | The number of naming attribute value strings that follow. |
| NamingAttributeValue | This parameter indicates which instance(s) of the ObjectClassName should be specified in the TL1 command translation. |
| ScopingCode | An indication that this message is one of a possible set of scoped/filtered messages that are the result of one CMIP request. The value of SINGLE indicates a single message was generated from the CMIP request. A value of MULTIPLE indicates that multiple Mapper messages were generated by the Agent as the result of scoping and filtering and that this message is one of many. A value of LAST indicates that the message is the last in the list. |
| nAttributes | The number of value description structures that follow. |
| Attributes | Each of the ValueStruct structures allow the description of a variety of attributes or action syntax types. |
| SyntaxType | The type of the syntax found in the Attribute Value portion of the message. For example, "Integer" or "PrintableString" are generic examples. |
| AttributeName | The name of the attribute or action name involved in an operation is indicated here by a zero-terminated string. The name is generally used by mapper 300 for translation to the AID field of the TL1 command. |
| AttributeLength | The length of the AttributeValue field that follows. This value specifies the number of octets in the stream. |
| AttributeValue | A string of octets representing the syntax value. |

The function calls that make up the interface between agent 201 and mapper 300 are: TL1GWMapperBind( ), TL1GWMapperSend( ), TL1GWMapperReceive( ) and TL1GWMapperUnbind( ). TL1GWMapperBind( ) must be called first; TL1GWMapperSend( ) and TL1GWMapperReceive( ) are called during the life of a session; and TL1GWMapperUnbind( ) is called at the end of a session. The calls to SendObject( ) and ReceiveObject( ) are supporting calls for ASN.1 syntax translation.

The TL1GWMapperBind( ) function is called by agent 201 to bind to the gateway for a particular legacy network element. The function opens a mailbox interface in both directions between agent 201 and mapper 300. When calling the function, the TID for the network element of the application wished to communicate with must be passed with a function call. The function returns either SUCCESS, FAILURE or ALREADYOPEN.

The SendObject( ) function is a supporting function call used prior to calling TL1GWMapperSend( ). It is used to translate from decoded ASN.1 "C" structures to ASCII format. This function is used to translate attributes syntaxes for GET and SET operations. SendObject( ) sets up all the attributes before a call to TL1GWMapperSend( ). There are five input parameters to SendObject:

| | |
|---|---|
| pHandle | A pointer to a handle variable. The first time the handle variable should be NULL. Subsequent calls to add items to the list should be made with the same handle setting. |
| SyntaxType | The type of the syntax found in the value portion of the message. For example, "Integer" or "PrintableString" are generic examples. |

| | |
|---|---|
| AttributeName | A zero-terminated string representing the name of the attribute or action. The name should match the spelling in the GDMO. |
| Value Length | The length of the field that follows. When no value is associated with the attribute name, such as in a GET operation, the value length may be 0. |
| ValuePointer | A pointer to the string of octets representing the attribute's value. |

The TL1GWMapperSend( ) function is called to initiate a mapper translation to a TL1 message. The function has the following parameters:

| | |
|---|---|
| ReferenceNbr | The CMIP reference number. This field will be present in the response that matches the request. |
| CommandType | Indicates the type of CMIP request. Possible values are CREATE, GET, CANCEL-GET, SET, ACTION, EVENT-REPORT (also known as NOTIFICATION), DELETE. |
| ManagedElementId | This value identifies the system in the network being managed and is the value of the naming attribute for the Managed Element object class. This value is used to derive the TID, and is passed as a zero-terminated string. |
| ObjectClassName | The object class name, passed as a zero-terminated string. |
| nNamingAttributes | The number of entries in the NamingAttributeList. |
| NamingAttributeList | The naming attribute value parameter indicates the list of instances of the ObjectClassName, and is passed as an array of zero-terminated strings. |
| ScopingCode | An indication that this message is part of a scoping and filtering CMIP request that generates multiple Mapper messages for one CMIP message. The value of SINGLE indicates a single message was generated from the CMIP request. A value of MULTIPLE indicates that a message is one of multiple messages sent by the Agent. A value of LAST indicates that the message is the last in the list of multiple SCOPED messages. |
| ObjectHandle | Identifies the set of syntax components required for the call. |

The TL1GWMapperReceive( ) function is called to check for and receive responses and notifications coming from the gateway. When a message is available, the application will receive a handle for the incoming syntax objects plus the original command type and request CMIP reference number. When no message is available, the TL1GWMapperReceive( ) function will return NOMSG. This allows for a non-blocking check of the incoming messages. When the return code is NOMSG, the values of the return parameters will be unchanged. This function includes three input parameters:

| | |
|---|---|
| pReferenceNbrRet | A pointer to an area in memory where the original ReferenceNbr is returned when a message is available. |
| pCommandTypeNbrRet | A pointer to an area in memory where the original CommandType (e.g. GET, SET, etc.) is returned when a message is available. |
| pHandleRet | A pointer to an area in memory where the Handle for the incoming information syntax is returned when a message is available. |

The ReceiveObject( ) function is a part of the Object Translation interface and is a supporting function call used following TL1GWMapperReceive( ). It accepts values in ASCII format and for translation into decoded ASN.1 "C" structures. ReceiveObject( ) is used to accept attribute values for GET operations as well as information reply syntaxes as the result of ACTION, and NOTIFICATION syntaxes. The input parameters for ReceiveObject( ) are:

| | |
|---|---|
| Handle | The handle variable received from the TL1GWMapperReceive() call. |
| pSyntaxTypeRet | A pointer to an integer where the syntax type setting is returned. The type of the syntax indicates what format the string of octets value is in. |
| pAttributeNameRet | A pointer to memory where the zero-terminated string's pointer representing the name of the attribute or action is returned. The name matches the spelling in the ASN.1 section of the GDMO. This allows complex ASN.1 definitions to be divided into simpler types. |
| pValueLengthRet | A pointer to an integer where the length of the field that follows is returned. |
| pValuePointerRet | A pointer to a pointer variable that indicates the location of the string of octets representing the attribute's value. |

The FreeObject( ) function is a supporting function call used following TL1GWMapperReceive( ), and is used to release dynamically allocated memory. The only input parameter is a handle variable receive from TL1GWMapperReceive( ).

During operation, mapper 300 runs a dispatcher loop that checks the interface between mapper 300 and agent 201 for CMIP messages, checks response handler 314 for TL1 messages, and checks for any TL1 application messages. When mapper 300 receives a message from agent 201, via the interface described above, mapper 300 accesses queue 301 which stores the states of all pending requests and responses. The mapper will create a new entry on queue 301 corresponding to the received request. Each queue entry will include state information comprising the CMIP reference number, a command type, the object class of the message request, the name of the attributes of the object class and any other data relative to the service. The queue entry will also include a legacy syntax message identification which is a unique identifier for the legacy syntax command that will be sent from the mapper to the legacy network element. For TL1, the legacy syntax message identification is called a CTAG. Thus, when the legacy network element responds, the response will also include that CTAG so mapper 300 will be able to access and match the proper entry in the queue.

Scoping and filtering messages involves agent 201 and mapper 300. Scoping is a process of restricting the message to apply to a subset of the network elements in a particular network. Filtering is further limiting the message to those objects meeting certain requirements, for example, a desired operational state. Agent 201 maintains a local MIB storage which reflects much of the network element information and is referenced during filter operations. If the filtering requirements in agent 201 require, for example, a certain static value be checked for a particular attribute within the object, and that setting is not yet known within the local MIB, an intermediate logic step may be required by the agent to obtain the attribute information in the form of an additional request and response from the network element to obtain it. The logic to obtain the unknown values is the responsibility of agent 201.

Agent 201 has the option of generating multiple requests to the mapper during a scoping/filtering operation. An indication in the message from agent 201 to mapper 300 in the ScopingCode field of the function call TL1GWMapperSend( ) indicates when a request is one of many requests generated by agent 201 as part of scoping/filtering operation. Mapper 300 will receive multiple TL1GWMapperSend( ) calls each with the same ReferenceNbr and with the ScopingCode set to MULTIPLE (or LAST). When the mapper sets up the queue entry for a group of scoping message, the entry for each command will have the same CMIP reference number but a different CTAG.

When scoping and filtering results in a many to one mapping, many CMIP requests for filtered objects map to one legacy syntax command. In the mapper queue, many requests with different CMIP reference numbers are queued for the same CTAG. Another scenario is one to many mapping, one CMIP request generates multiple TL1 or legacy syntax commands. This could happen in a request to get an attribute list which are obtained via different TL1 commands. In mapper queue 301, each TL1 command generates a queue entry with the same CMIP reference number and different CTAGs.

After the queue entry is set up, mapper 300 will access CFG DATA 320 based on the TID which is in the message request. The information in CFG DATA 320 (including the legacy network elements manufacturer, make and model) will enable mapper 300 to access the proper dictionary 304. Mapper 300 calls the appropriate object class in the dictionary depending on the message request and translates the CMIP message request to one or more TL1 messages. If the CMIP request only maps to one TL1 message, then that TL1 message would be sent with the CTAG in queue 301. If the CMIP request maps to many TL1 messages, then another entry is made on queue 301 to include a CTAG for each TL1 message sent to the network legacy element. Sometimes a CMIP message may map to more than one legacy syntax command where a second command can only be sent after the response to the first command is received because the content of the second command is based on the response to the first command. For example, the second command could be a follow up to information received from the response to the first command. This is called a state transition function. In such a case, mapper 300 would send the first command and save the second command in the queue when the first command response is received, mapper 300 will then send out the appropriate second command.

The following command module pseudocode represents the command logic performed by mapper 300 when receiving requests from agent 201 and sending legacy syntax commands to a legacy network element:

```
if (message received) {
    queue state information (request reference number, command type,
        object class, naming attributes, etc.)
    if the message is ...
    a single message, or the first of multiple:
        queue a new CTAG to the reference number
    one of multiple scope/filter messages:
        queue the same CTAG to the reference number
        check to make sure filtered message is same request type
        identifying a different instance
        add naming attribute to message
        if this is not the last message,
            return until all have arrived
    look up the TID
    read the configuration information for the TID (in CFG DATA 320)
    load the appropriate dictionary to the TID's model
    pass the message components as parameters to fill the mapper
        message class structure
    call the object class function depending on the object class
        and command type parameters
    store multiple TL1 messages (if multiple TL1 messages returned from
        dictionary) generate multiple queue entries each with its own
        CTAG
    store optional state transition function returned
    send the TL1 command(s) to the Command Generator
}
```

When mapper 300 receives a response from the response handler 314, mapper 300 first searches queue 301, based on the CTAG, for the appropriate entry. If the TL1 response resulted from a series of TL1 requests (e.g. one CMIP request mapped to many TL1 commands each associated with the same CMIP reference number), then the TL1 response is stored in queue 301 and mapper 300 waits for the rest of the responses for that CMIP reference number. If the response was the only response expected for a CMIP reference number or all responses expected have been received, then mapper 300 will read the configuration information for that particular TID, load the corresponding dictionary and translate the TL1 response back to CMIP.

If the return message was an autonomous message (alarm), then there would be no queue entry for that incoming response. Mapper 300 would simply set a command type for the alarm for notification to the agent, and based on the TID that came with the alarm, access the appropriate dictionary and translate the TL1 alarm to CMIP. If an acknowledgement is received in response to a command it is analyzed to determine if the command was accepted or rejected. If the command was accepted, the acknowledgement is discarded and processing continues. If the command is rejected the associated command entry is removed from queue 301 and an error is returned by mapper 300 to agent 201.

The following response module pseudocode represents the response logic mapper 300 performs when a message is received from the response handler 316:

```
if (message received) {
    if response
        search queue for the matching request using the CTAG
        if the CMIP reference number has more TL1 request messages
            out, queue the response and return
        if there is a state transition function
            pass all the message components as parameters and call
                the state transition function
            store returned TL1 msgs, generate queue entry for
                multiple msgs each with own CTAG
            store optional state transition function
            send the TL1 command(s) to Command Generator
            return
    else autonomous messages (e.g. alarm)
        set command type for notification
        parse TID and set object class
    read the configuration information for the TID
    load/set the active dictionary to the TID's model
    for each dequeued message or alarm {
        call the object class function depending on the object class and
            command type parameters
        pass the response as the parameter
        send the mapper interface message
    }
}
```

E. Dictionaries

The data dictionaries (e.g. 304 and 306) contain the specific knowledge on how to map CMIP syntax to legacy syntax for each of the legacy network elements. Including individual vendor dictionaries allows specific syntax and capabilities of different manufacturers to be easily incorporated.

The data dictionaries cannot be straight mapping rules combined with interpretive legacy syntax language because the number of exceptions makes such a dictionary not feasible. The approach taken is comparable to a giant table of CMIP variables on the left and a corresponding TL1 command on the right. The CMIP variables would include: object class name, CMIP command type, naming attributes, syntax names, and syntax values. The structure of the GDMOs with its object class inheritance tree definitions lends itself to designing the dictionaries in C++ format in the hierarchal structure of the inheritance tree of the GDMOs.

Below is pseudocode showing a portion of a TL1 data dictionary that maps CMIP object classes for ds1TTPSinkCurrentData to the TL1 commands involving PM reports. The inheritance tree for the classes defined in the sample dictionary includes a "top" class at the top of the tree. Under "top" is the "current data" class. Below "current data" is "ds1TTSinkCurrentData." Below "ds1TTPSinkCurrentData" are two classes: "ds1TTPSinkCurrentData" and "ds1PathTTPSinkCurrentData." Each class has list of valid attributes that are contained within that class level and a list of functions related to the command types—functions for GET, SET, ACTION, REPLY, CREATE, DELETE and NOTIFICATIONS. Not all of these functions have corresponding TL1 commands and may be empty.

F. Alarms

Intelligent Alarm Filter (LAP) 316 is used in conjunction with GUI 322 or its own graphic user interface to categorize incoming alarms and only pass on those alarms belonging to predetermined set of categories. For example, IAF 316 is generally programmed to screen non-service affecting messages from service affecting messages prior to forwarding to mapper 300. Alarms forwarded to mapper 300 are translated to CMIP and transmitted to manager 200. Alternatively, IAF 316 could be used to filter messages using other criteria; for example, only messages from certain TIDS, certain errors, certain events, etc. Using a graphic interface allows a user to view all alarms or only the filtered.

IAF 316 is completely optional. Gateway 204 is completely functional without IAF 316. However, IAF 316 can greatly reduce the overhead of the gateway and thereby reduce the number of notifications that may be needlessly forwarded to manager 200.

An alternative embodiment could also include a trace application which allows real time access to outgoing and incoming legacy syntax messages. For example, this module could give access to the raw TL1 information as it is transmitted to and received from the legacy network elements.

G. Example

Figure 6:
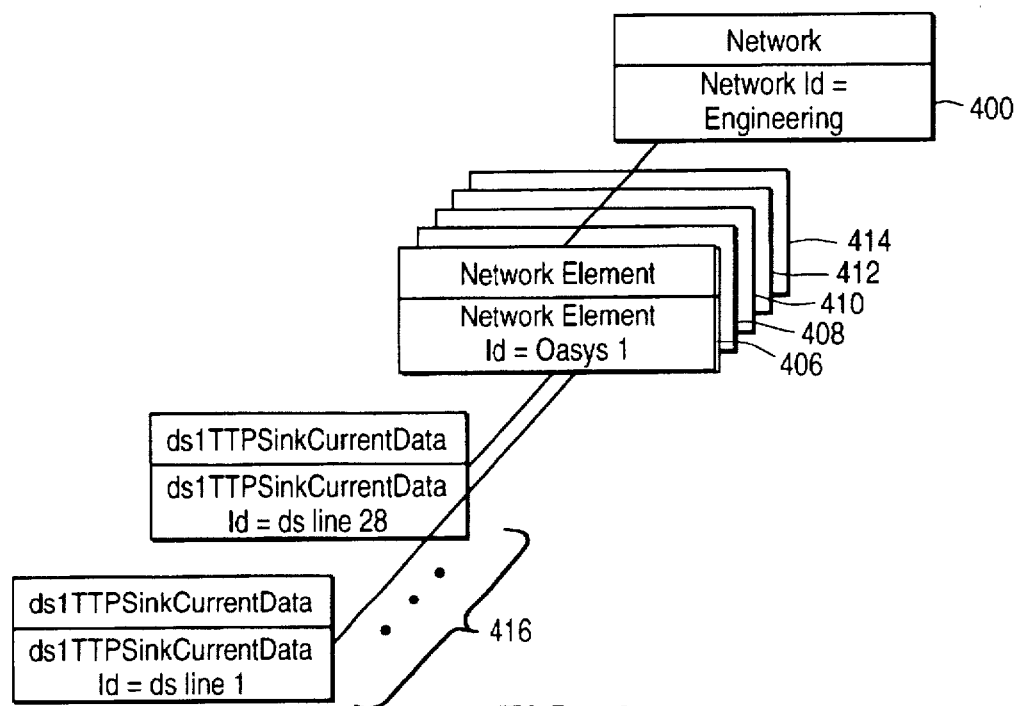
FIG. 6 is a managed object inheritance tree which is part of the Management Information Base (MIB) for the network depicted in FIG. 3.

The following is an example of the operation of gateway 204 using the network depicted in FIG. 3. FIG. 2 shows a partial inheritance tree for the managed object classes of the managed objects depicted in FIG. 3. FIG. 6 shows a partial inheritance tree for the managed objects of the network of FIG. 3. Below the top of the inheritance tree of FIG. 5 is an instance 400 of the network class whose RDN is "engineering." As depicted in FIG. 5, below the network class is the network element class. The model for the network of FIG. 3 includes five instances of the network element class. Network element instance 406 has an RDN of "Oasys1" and corresponds to legacy network element 206 of FIG. 3. Network element instance 408 has an RDN of "Oasys2" and corresponds to legacy network element 208 of FIG. 3. Network element instance 410 has an RDN of "Oasys3" and corresponds to legacy network element 210. Network element instance 412 has an RDN of "Oasys4" and corresponds to network element 212 of FIG. 3. Network element instance 414 has an RDN of "Oasys5" and corresponds to network element 214. The inheritance tree also includes managed objects which are below each of the network elements. For example purposes, FIG. 5 only shows the managed objects beneath "Oasys1" 506. This includes twenty eight line cards which are instances of the class ds1TTPSinkCurrentData. The class definition for ds1TTPSinkCurrentData can be found in the example dictionary recited above. Two of the attributes associated with ds1TTPSinkCurrentData are "administrativestate" and an error counter "cV." As described above, "administrativeState" indicates whether the line card is locked, unlocked or shutting down. The error counter cV counts the code violations experienced by the line cards. When cV =0, no code violations have occurred.

For purposes of this example, assume that manager 200 desires to know the cV value for all the line cards in network element 206 that are in the unlocked state. Thus, manager 200 will issue a GET command, where the base managed object class is network element and the base object instance is "Oasys1." The scope of the command will be search from the base instance downward on the inheritance tree. The filtering will include issuing the command to all instances that have the administrative state in the unlocked state. The attribute identification list would include reference to cV. Such a GET command would be issued from manager 200 and received by agent 201.

Sometime prior to receiving the GET command, agent 201 would have bound itself to gateway 204, at which time gateway 204 would send all the static information about the MIB to agent 201. That is, agent 201 would be in possession of the inheritance tree shown in FIG. 5 and the static variables and attributes associated with each of the instances. Thus, prior to receiving the GET command from manager 200, agent 201 would know that network element 206 ("Oasys1") includes twenty eight line cards and, for example purposes, that all twenty eight line cards are in the unlocked state.

Once receiving the GET command from manager 200, agent 201 will call the function SendObject( ) passing a pointer to the handle variable, "Integer" as the syntax, "cV" as the attribute name and "Null" as the Value Length. Agent 201 will then call TL1GWMapperSend passing 123 as ReferenceNbr, GET as the CommandType, "Oasys1" as the ManagedElementId, "ds1TTPSinkCurrentData" as the ObjectClassName, 28 as the nNamingAttributes, "dsline1" . . . dsline28"as the NamingAttributeList, SINGLE as the ScopingCode and an object handle.

After receiving both function calls, mapper 300 will set up an entry on queue 301 and assign a CTAG. For example purposes, assume that mapper assigns a CTAG equal to 456. Mapper 300 will also look up "Oasys1" in CFG DATA 320 in order to find out the manufacturer and model, etc. of legacy network element 206. Based on the information in CFG DATA 320, mapper 300 accesses the proper dictionary, which includes the sample dictionary cited above.

Looking at the sample dictionary above the class definition for "ds1TTPSinkCurrentData" appears in the labelled lines [E1]–[E85]. Because manager 200 is sending a GET command, mapper 300 would access the portion of the dictionary staring at marked line [E25]. The form of the TL1 command will be RTRV-PM-[modifier]:TID:AID:CTAG::ATTRIBUTE;. The fields RTRV-PM-[modifier] corresponds to the <command code> of the TL1 command. The fields TID:AID:CTAG corresponds to the <staging parameter blocks> of the TL1 command. The ATTRIBUTE field corresponds to the <message payload block(s) > of the TL1command.

In lines [E31]–[E36] of the dictionary, a value is being determined for the variable "modifier." In the current example, the variable "modifier" is filled with the string "T1" which signifies Transmission Entity 1. In lines [E37]–[E43], the dictionary is filling in the value for the AID parameter. In the present case, that value should be "ALL" since all 28 line cards will be accessed. Lines [E44]–[E69] are used to put the proper attributes in the TL1 message. The dictionary uses a spelling table to map cV to the proper TL1 syntax. The spelling table would, figuratively, include three columns. The first column is object class name, the second column is the CMIP attribute syntax and the third column would be the TL1 spelling. In the present case, cV would map to CVL. Lines [E70]–[E72] allocate space for a new TL1 command and lines E76–E85 map the data to the TL1 command: RTRV-PM-T1:Oasys1:ALL:456::CVL;. This TL1 command would be sent to command generator 312 which sends the TL1 command to legacy network element 206. Mapper 300 will periodically check response handler 316 for an incoming response.

After receiving the TL1 command and acquiring the requested information, legacy network element 206 sends a response in the following format to response handler 314:

Oasys1 [date time]

m 456 compld

"3-1-1,T1:CVL,00001,[other information]"

"3-1-2,T1:CVL,00008,[other information]"

. . .

"3-7-4,T1:CVL,00000,[other information]"

The first line of the response includes the name of the network element, the time the response was transmitted and date the response was transmitted. The second line indicates the CTAG (456) and that the request was completed successfully (COMPLD). In the remaining lines of the response, the first column of the response message (e.g. 3-1-1) identifies the source of the response, which in this case is a line card. The source is identified by three numbers, the first number indicates the rack on the network element, the second number indicates the shelf on the identified rack and the third number indicates the line card on the identified shelf. For example purposes, all twenty eight line cards on legacy network element 206 (Oasys1) are on rack 3. There are seven shelves, each shelf includes four line cards. Thus, "3-1-1" corresponds to the first line card "dsline1," "3-1-2" corresponds to "dsline2 " . . . "3-7-4" corresponds to "dsline28." The second column of the response includes the T1 modifier which identifies that the response is from a Transmission Entity 1. The third column identifies the attribute being transmitted (CVL). The fourth column is the value of the CVL attribute. For example, "dsline1" experienced one code violation, "dsline2" experienced eight code violations and "dsline28" did not experience any code violations.

After the gateway receives the TL1 response, mapper 300 will search queue 301 for the matching request using the CTAG=456. After reading and updating the appropriate queue entry, mapper 300 will load the appropriate dictionary and call the appropriate object class.

Agent 201 periodically calls TL1GWMapperReceive( ). After gateway 200 has received the response from legacy network element 206, mapper 300 will respond to TL1GWMapperReceive( ) by returning values including ReferenceNbr =123, CommandType=GET. Agent 201 will then call ReceiveObject( ) which returns twenty eight messages, one for each line card. Each of the messages includes the appropriate value for the cV setting for the particular line card. For example, the response returned for the first line card would include "Integer" as the syntax type, "cV" as the attribute name, five as the ValueLength and 0001 as the attribute's value. Agent 201 would then uses the information received from the twenty eight line cards to send one or more responses to manager 200.

The foregoing detailed description of the invention has been presented for purposes of illustration and description. It is not intended to be exhaustive or to limit the invention to the precise form disclosed, and obviously many modifications and variations are possible in light of the above teaching. The described embodiment of the gateway was chosen in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

/****************************************************************

Copyright (c) 1995 The OASys Group. All rights reserved.
    59 N. Santa Cruz Ave Suite Q, Los Gatos, CA 95030
****************************************************************

This module contains a general dictionary file using TL1 commands from the Bellcore 833 manual. This file may be used as a starting point for different manufacturer's dictionary specifications.

To edit this file for a particular manufacturer's model, assign a unique identifier and change the "model_" prefix on all the definitions.

/* function prototypes for mapping utility functions to gateway */

Attorney Docket No.: OASS1000WSW/BBM
    bbm/oass/1000.001

- 39 -

```
    int MapAIDBasedOnNamingAttributes(AidStructure *ptable,
                    int nNamingAttributes,
                    char **NamingAttributes,
                    char *AID);
5   int MapModifierBasedOnObjectClass(ModifierStructure *ptable,
                    char *objectclassname,
                    char *modifier);
    int MapAttributeListToTL1Spelling(SpellingIndex *index,
                    SpellingStructure *table,
10                  ValueStruct *pattr,
                    mapr_msg_t *pMapMsg,
                    char *registers);
    int MapAttributeValues(ValueStruct *pAttr, char *values);

15  /* function prototypes for mapping utility functions from gateway */ char *MapNamingAttributeBasedOnAID(AidStructure *ptable,char *AID);

void MapTL1Attribute(SpellingIndex *index, SpellingStructure *table,
20                  mapr_msg_t *pMapperMsg, char *AID);

int MapPositionalParameter( aidresp_t *, int, int, ValueStruct *);

ValueStruct *MapAttributeListToCMIPSpelling(SpellingStructure *table,
25                  mapr_msg_t *, int,
                    char *paid);

/***********************************************************************/
30  /****************** BASED ON THE INHERITANCE TREE *********************/
    /***********************************************************************/

/*
    First there is the list of valid attributes per object class.  Each
35  constructor function adds its valid attributes for that class to the
    list inherited from the level(s) above.  Then there are the
```

Attorney Docket No.: OASS1000WSW/BBM
bbm/oass/1000.001

- 40 - transformation functions to convert a TL1 command into a get, set, or
action. Also there are transformation functions to convert a TL1
response into a reply or notification.
*/

```
/****************************************************************
                    class "top"
****************************************************************/
class model_top {
private:
    char *pattr;

protected:
    /* temporary areas used in mapping TL1 command components */
    char modifier[MAX_MOD_LENGTH];
    char AID[MAX_AID_LENGTH*MAX_AID_ENTRIES];
    char registers[MAXATTRSIZE*MAXATTRS];
    char registertwo[MAXATTRSIZE*MAXATTRS];
    char values[MAXATTRSIZE*MAXATTRS];
    char valuetwo[MAXATTRSIZE*MAXATTRS];

public:
    /* flag to indicate whether to generate response back */ int  ResolveLocally;

int  nbrNamingAttributes;
    char *NamingAttributes[MAX_AID_ENTRIES];

/*
    The list of valid attributes is inherited by each class from the top
    and is initialized by the constructors to the GDMO spellings.
    */ int  validNbrAttrs;
    char *validAttrList[MAXATTRS];
```

Attorney Docket No.: OASS1000WSW/BBM
bbm/oass/1000.001

- 41 -

```
    /*
    The TL1 command is transformed from the input mapper api information
    It is inherited by each class from the top even though there is no
    TL1 command equivalent to top class.
5   */

TL1Command *pTL1Command;

/*
10  The Mapper API response is transformed from the TL1 response.  It is
    inherited by each class from the top.
    */ mapr_msg_t *pMapperMsg;
15
    set_mappermsg_ptr(mapr_msg_t *pMsg)
    {
       pMapperMsg = pMsg;
       return(SUCCESS);
20  }

/* Note that replies should Dequeue the mapper message and handle
       all messages queued with the same reference number. */

25  model_top()              /* constructor function */
    {
       nbrNamingAttributes = 0;
       NamingAttributes[nbrNamingAttributes] = NULL;

30     validNbrAttrs=0;
       validAttrList[validNbrAttrs] = "objectClass";
       validNbrAttrs++;
       validAttrList[validNbrAttrs] = "nameBinding";
       validNbrAttrs++;
35     validAttrList[validNbrAttrs] = "packages";
       validNbrAttrs++;
```

- 42 -

```
       validAttrList[validNbrAttrs] = "allomorphs";
       validNbrAttrs++;
    }

5  /*
    This is the list of functions inherited by all the classes.
    */
    virtual int get() {
       int i;
10
       for (i=0; i<pMapperMsg->nAttrs; i++) {
          pattr = pMapperMsg->Attrs[i]->AttributeName;

if (!strcmp(pattr, "objectClass")) {
15           pMapperMsg->Attrs[i]->AttributeLength =
                 strlen(pMapperMsg->ObjectClassName);
             pMapperMsg->Attrs[i]->AttributeValue =
                 pMapperMsg->ObjectClassName;
             pMapperMsg->Attrs[i]->MappingStatus = RESOLVED;
20           ResolveLocally++;
          }
          else if ((!strcmp(pattr, "nameBinding")) ||
                   (!strcmp(pattr, "packages")) ||
                   (!strcmp(pattr, "allomorphs"))) {
25           pMapperMsg->Attrs[i]->MappingStatus = NOTIMPLEMENTED;
             ResolveLocally++;
          }
       }
       return(SUCCESS);
30  } virtual int set() { return(SUCCESS); }
    virtual int action() { return(SUCCESS); }
    virtual int notification(tl1_resp_t *pTL1Response) { return(SUCCESS); }
35  virtual int getreply(tl1_resp_t *pTL1Response) { return(SUCCESS); }
    virtual int setreply(tl1_resp_t *pTL1Response) { return(SUCCESS); }
```

Attorney Docket No.: OASS1000WSW/BBM
bbm/oass/1000.001

- 43 -

```
     virtual int actionreply(tll_resp_t *pTL1Response) { return(SUCCESS); }
   };

/*********************************************************************
5                        class "managedElement"
   *********************************************************************/
   class model_managedElement : public model_top { public:
10
     virtual int get() { return(model_top::get()); }
     virtual int set() { return(SUCCESS); }
     virtual int action() { return(SUCCESS); }
     virtual int notification(tll_resp_t *pTL1Response) { return(SUCCESS); }
15   virtual int getreply(tll_resp_t *pTL1Response) { return(SUCCESS); }
     virtual int setreply(tll_resp_t *pTL1Response)
     {
        if ((char *)&pTL1Response->codevals[0] == "COMPLD") return(SUCCESS);
        if ((char *)&pTL1Response->codevals[0] == "DENY") return(FAILURE);
20      return(SUCCESS);
     }
     - virtual int actionreply(tll_resp_t *pTL1Response) { return(SUCCESS); } model_managedElement() {        /* constructor function */
25      }
   };

/*********************************************************************
                        class "currentData"
30 *********************************************************************/
   class model_currentData : public model_top {
   private:
      char *pattr;

35 public:
     virtual int get();

Attorney Docket No.: OASS1000WSW/BBM
   bbm/oass/1000.001
```

- 44 -

```
        virtual int set();
        virtual int action();
        virtual int notification(tl1_resp_t *pTL1Response);
        virtual int getreply(tl1_resp_t *pTL1Response);
5       virtual int setreply(tl1_resp_t *pTL1Response);
        virtual int actionreply(tl1_resp_t *pTL1Response);

model_currentData() {      /* constructor function */

10         /*
              This is the list of default naming attributes for
              instantiations of this object class.
           */

15         nbrNamingAttributes = 28;
           NamingAttributes[0] = "dsLine1";
           NamingAttributes[1] = "dsLine2";
           NamingAttributes[2] = "dsLine3";
           NamingAttributes[3] = "dsLine4";
20         NamingAttributes[4] = "dsLine5";
           NamingAttributes[5] = "dsLine6";
           NamingAttributes[6] = "dsLine7";
           NamingAttributes[7] = "dsLine8";
           NamingAttributes[8] = "dsLine9";
25         NamingAttributes[9] = "dsLine10";
           NamingAttributes[10] = "dsLine11";
           NamingAttributes[11] = "dsLine12";
           NamingAttributes[12] = "dsLine13";
           NamingAttributes[13] = "dsLine14";
30         NamingAttributes[14] = "dsLine15";
           NamingAttributes[15] = "dsLine16";
           NamingAttributes[16] = "dsLine17";
           NamingAttributes[17] = "dsLine18";
           NamingAttributes[18] = "dsLine19";
35         NamingAttributes[19] = "dsLine20";
           NamingAttributes[20] = "dsLine21";
```

Attorney Docket No.: OASS1000WSW/BBM
bbm/oass/1000.001

- 45 -

```
            NamingAttributes[21] = "dsLine22";
            NamingAttributes[22] = "dsLine23";
            NamingAttributes[23] = "dsLine24";
            NamingAttributes[24] = "dsLine25";
 5          NamingAttributes[25] = "dsLine26";
            NamingAttributes[26] = "dsLine27";
            NamingAttributes[27] = "dsLine28";
            NamingAttributes[28] = NULL;

10          validAttrList[validNbrAttrs] = "currentDataId";
            validNbrAttrs++;
            validAttrList[validNbrAttrs] = "performanceSummaryInterval";
            validNbrAttrs++;
            validAttrList[validNbrAttrs] = "administrativeState";
15          validNbrAttrs++;
            validAttrList[validNbrAttrs] = "suspectFlag";
            validNbrAttrs++;
            validAttrList[validNbrAttrs] = "elapsedTime";
            validNbrAttrs++;
20      /* this is a notification, not an attribute ...
            validAttrList[validNbrAttrs] = "spontaneousPMDataReporting";
            validNbrAttrs++;
        */
            validAttrList[validNbrAttrs] = "historyLength";
25          validNbrAttrs++;
            validAttrList[validNbrAttrs] = "numPrecConZeros";
            validNbrAttrs++;
            validAttrList[validNbrAttrs] = "weekMask";
            validNbrAttrs++;
30          validAttrList[validNbrAttrs] = "reportablePMAttributeList";
            validNbrAttrs++;
        /* this is a notification, not an attribute ...
            validAttrList[validNbrAttrs] = "scheduledPMDataReporting";
            validNbrAttrs++;
35      */
            validAttrList[validNbrAttrs] = "thresholdDataInstance";
```

Attorney Docket No.: OASS1000WSW/BBM
bbm/oass/1000.001

- 46 -

```
        validNbrAttrs++;
        validAttrList[validNbrAttrs] = "startTimeOffset";
        validNbrAttrs++;
        validAttrList[validNbrAttrs] = "additionalPMAttributeList";
5       validNbrAttrs++;
        }
    };

int model_currentData::get()
10  {
        int i, case1, case2;

case1=0;
        case2=0;
15
        model_top::get();

if (MapModifierBasedOnObjectClass(model_ModifierTable,
                            pMapperMsg->ObjectClassName,
20                          modifier) == FAILURE) {
            /* return error code */
            return(NOMODTRANSLATION);
        }
        if (MapAIDBasedOnNamingAttributes(model_AIDTable,
25                          pMapperMsg->nNamingAttributes,
                            pMapperMsg->NamingAttributes,
                            AID) == FAILURE) {
            /* return error code */
            return(NOAIDTRANSLATION);
30      } for (i=0; i<pMapperMsg->nAttrs; i++) {
            pattr = pMapperMsg->Attrs[i]->AttributeName;

35          if ((!strcmp(pattr, "performanceSummaryInterval")) ||
                (!strcmp(pattr, "administrativeState")) ||
```

- 47 -

```
                  (!strcmp(pattr, "startTimeOffset"))) { pMapperMsg->Attrs[i]->MappingStatus = MAPPED;

5                if (!case1) {
                      /* constructor function generates a new CTAG */
                      pTL1Command = new TL1Command;

/*--------------------------------------------*/
10                    /* map to command: RTRV-PMSCHED-%T1:%TID:%AID:%CTAG;  */
                      /*--------------------------------------------*/
                      sprintf(pTL1Command->CommandString,
                          "RTRV-PMSCHED-%s:%s:%s:%s::;",
                          modifier, pMapperMsg->TID, AID, pTL1Command->CTAG);
15
                      /* send command function queues and sends */
                      pTL1Command->sendCommand(pMapperMsg);
                      delete pTL1Command;

20                    case1++;
                  }
              }
              else if ((!strcmp(pattr, "suspectFlag")) ||
                      (!strcmp(pattr, "elapsedTime"))) {
25
                  pMapperMsg->Attrs[i]->MappingStatus = MAPPED;

if (!case2) {
                      pTL1Command = new TL1Command;
30                    /*--------------------------------------------*/
                      /* map to command: RTRV-PM-%T1:%TID:%AID:%CTAG;  */
                      /*--------------------------------------------*/
                      sprintf(pTL1Command->CommandString,
                          "RTRV-PM-%s:%s:%s:%s::;",
35                        modifier, pMapperMsg->TID, AID, pTL1Command->CTAG);
                      pTL1Command->sendCommand(pMapperMsg);
```

Attorney Docket No.: OASS1000WSW/BBM
bbm/oass/1000.001

- 48 -

```
             delete pTL1Command;
             case2++;
          }
          break;
5      }
       else if (!strcmp(pattr, "currentDataId")) {
          /* currentDataId is the naming attribute */
          pMapperMsg->Attrs[i]->AttributeLength =
             strlen(pMapperMsg->NamingAttributes[0]);
10        pMapperMsg->Attrs[i]->AttributeValue =
             pMapperMsg->NamingAttributes[0];
          pMapperMsg->Attrs[i]->MappingStatus = RESOLVED;
          ResolveLocally++;
       }
15     else if ((!strcmp(pattr, "historyLength")) ||
             (!strcmp(pattr, "numPrecConZeros")) ||
             (!strcmp(pattr, "weekMask")) ||
             (!strcmp(pattr, "reportablePMAttributeList")) ||
             (!strcmp(pattr, "thresholdDataInstance")) ||
20           (!strcmp(pattr, "additionalPMAttributeList"))) {
          pMapperMsg->Attrs[i]->MappingStatus = NOTIMPLEMENTED;
          ResolveLocally++;
       }
       /* not handled, no corresponding TL1 command */
25     /* this is ok, will be picked up at another object class level */
    }
    return(SUCCESS);
 }

30 model_currentData::set()
   {
      int i;

model_top::set();
35
      if (MapModifierBasedOnObjectClass(model_ModifierTable,
```

Attorney Docket No.: OASS1000WSW/BBM
bbm/oass/1000.001

- 49 -

```
                            pMapperMsg->ObjectClassName,
                            modifier) == FAILURE) {
        /* return error code */
        return(NOMODTRANSLATION);
5   }
    if (MapAIDBasedOnNamingAttributes(model_AIDTable,
                            pMapperMsg->nNamingAttributes,
                            pMapperMsg->NamingAttributes,
                            AID) == FAILURE) {
10      /* return error code */
        return(NOAIDTRANSLATION);
    } for (i=0; i<pMapperMsg->nAttrs; i++) {
15      pattr = pMapperMsg->Attrs[i]->AttributeName;

if (!strcmp(pattr, "administrativeState")) {

/* constructor function generates a new CTAG */
20          pTL1Command = new TL1Command;

pattr = pMapperMsg->Attrs[i]->AttributeValue;
            if (!strcmp(pattr, "locked")) {
                /*---------------------------------*/
25              /* map to: INH-PMREPT-%T1:%TID:%AID:%CTAG; */
                /*---------------------------------*/
                sprintf(pTL1Command->CommandString,
                    "INH-PMREPT-%s:%s:%s:%s:::",
                    modifier, pMapperMsg->TID, AID,
30                  pTL1Command->CTAG);
                pMapperMsg->Attrs[i]->MappingStatus = MAPPED;
            }
            else if (!strcmp(pattr, "unlocked")) {
                /*---------------------------------*/
35              /* map to: ALW-PMREPT-%T1:%TID:%AID:%CTAG; */
                /*---------------------------------*/
```

Attorney Docket No.: OASS1000WSW/BBM
bbm/oass/1000.001

- 50 -

```
            sprintf(pTL1Command->CommandString,
               "ALW-PMREPT-%s:%s:%s:%s:;",
               modifier, pMapperMsg->TID, AID,
               pTL1Command->CTAG);
            pMapperMsg->Attrs[i]->MappingStatus = MAPPED;
         }
         else {
            /* value other than locked or unlocked */
            return(NOVALUETRANSLATION);
         }
         /* send command function queues and sends */
         pTL1Command->sendCommand(pMapperMsg);
         delete pTL1Command;

} /* end case administrativeState */
   }
   return(SUCCESS);
} model_currentData::action()
{
   /* there are no actions defined in the currentData object class */
   return(SUCCESS);
} model_currentData::notification(tl1_resp_t *pTL1Response)
{
   int i;
   char *paid;
   char *ptmp;
   int FENDtoggle;

/* deal with PMDataReporting in the currentData object class */ pMapperMsg->nNamingAttributes=0;
```

Attorney Docket No.: OASS1000WSW/BBM
bbm/oass/1000.001

- 51 -

```
     for (i=0; i<pTL1Response->aid_index; i++) {
        if ((paid=strchr((char *)&pTL1Response->aidvals[i], ':')) != 0) {
           *paid = '\0';
           if ((ptmp=strchr((char *)&pTL1Response->aidvals[i], ',')) != 0)
5             *ptmp = '\0';

if ((pMapperMsg->NamingAttributes[pMapperMsg->nNamingAttributes] =
              MapNamingAttributeBasedOnAID(model_AIDTable,
                 (char *)&pTL1Response->aidvals[i])) != NULL) {
10            pMapperMsg->nNamingAttributes++;
           }
           if (ptmp != 0) *ptmp = ',';
        }
     }
15
     pMapperMsg->Attrs[0] = new ValueStruct;
     if (pMapperMsg->Attrs[0] != NULL) {
        pMapperMsg->Attrs[0]->AttributeName = "scheduledPMDataReporting";
        pMapperMsg->Attrs[0]->AttributeLength = 0;
20   } pMapperMsg->nAttrs=1;

for (i=0; i<pTL1Response->aid_index; i++) {
25      paid = (char *)&pTL1Response->aidvals[i] +
           strlen((char *)&pTL1Response->aidvals[i]) + 1;

FENDtoggle=0;

30      if ((ptmp=strchr(paid, '"')) != 0) {
           *ptmp = '\0';
           if (strstr(paid, "FEND")) { FENDtoggle=1;}
           *ptmp = '"';
        }
35
        if ((pMapperMsg->Attrs[pMapperMsg->nAttrs] =
```

Attorney Docket No.: OASS1000WSW/BBM
bbm/oass/1000.001

- 52 -

```
                MapAttributeListToCMIPSpelling(model_SpellingTable,
                                pMapperMsg,
                                FENDtoggle,
                                paid)) != NULL) {
5
                pMapperMsg->nAttrs++;
            }
        }

10      return(SUCCESS);
     } model_currentData::getreply(tl1_resp_t *pTL1Response)
     {
15       int i;

for (i=0; i<pMapperMsg->nAttrs; i++) {
             pattr = pMapperMsg->Attrs[i]->AttributeName;

20           if (!strcmp(pattr, "performanceSummaryInterval")) {
                 /* if response is PMSCHED... */
                 if (!strncmp(GetOriginalVerb(pTL1Response->ctag),
                         "RTRV-PMSCHED", 12)) {
                     /* from tmper - accum time period */
25                   if (MapPositionalParameter(pTL1Response->aidvals,
                                     pTL1Response->aid_index,
                                     8, pMapperMsg->Attrs[i]) == SUCCESS)
                         pMapperMsg->Attrs[i]->MappingStatus = RESOLVED;
                 }
30           }
             if (!strcmp(pattr, "administrativeState")) {
                 /* if response is PMSCHED... */
                 if (!strncmp(GetOriginalVerb(pTL1Response->ctag),
                         "RTRV-PMSCHED", 12)) {
35                   /* from inhibit mode */
                     if (MapPositionalParameter(pTL1Response->aidvals,
```

Attorney Docket No.: OASS1000WSW/BBM
bbm/oass/1000.001

- 53 -

```
                      pTL1Response->aid_index,
                      10, pMapperMsg->Attrs[i]) == SUCCESS)
              if (!strcmp(pMapperMsg->Attrs[i]->AttributeValue, "ALW")) {
                  pMapperMsg->Attrs[i]->AttributeLength = strlen("unlocked");
5                 strcpy(pMapperMsg->Attrs[i]->AttributeValue, "unlocked");
              }
              else if (!strcmp(pMapperMsg->Attrs[i]->AttributeValue, "INH")) {
                  pMapperMsg->Attrs[i]->AttributeLength = strlen("locked");
                  strcpy(pMapperMsg->Attrs[i]->AttributeValue, "locked");
10            }
              pMapperMsg->Attrs[i]->MappingStatus = RESOLVED;
          }
       }
       if (!strcmp(pattr, "suspectFlag")) {
15         /* if response is RTRV-PM ... */
           if (!strncmp(GetOriginalVerb(pTL1Response->ctag),
                   "RTRV-PM-", 8)) {
              /* from COMPL in RTRV-PM response */
              if (!strcmp((char *)pTL1Response->codevals, "COMPLD"))
20                pMapperMsg->Attrs[i]->AttributeValue = "0"; /*false*/
              else
                  pMapperMsg->Attrs[i]->AttributeValue = "1"; /*true*/
              pMapperMsg->Attrs[i]->MappingStatus = RESOLVED;
           }
25     }
       if (!strcmp(pattr, "elapsedTime")) {
           /* if response is RTRV-PM ... */
           if (!strncmp(GetOriginalVerb(pTL1Response->ctag),
                   "RTRV-PM-", 8)) {
30            /* calculate using montm (begin time) to current time */
              if (MapPositionalParameter(pTL1Response->aidvals,
                          pTL1Response->aid_index,
                          7, pMapperMsg->Attrs[i]) == SUCCESS)
                  pMapperMsg->Attrs[i]->MappingStatus = RESOLVED;
35         }
       }
```

Attorney Docket No.: OASS1000WSW/BBM
bbm/oass/1000.001

- 54 -

```
               if (!strcmp(pattr, "numPrecConZeros")) {
                   /* calculated on every scheduledPMDataReporting NOTIFICATION */
                   /* pMapperMsg->Attrs[i]->MappingStatus = RESOLVED; */
               }
5              if (!strcmp(pattr, "startTimeOffset")) {
                   /* if response is PMSCHED... */
                   if (!strncmp(GetOriginalVerb(pTL1Response->ctag),
                             "RTRV-PMSCHED", 12)) {
                       /* from tmofst in response */
10                     if (MapPositionalParameter(pTL1Response->aidvals,
                                       pTL1Response->aid_index,
                                       9, pMapperMsg->Attrs[i]) == SUCCESS)
                           pMapperMsg->Attrs[i]->MappingStatus = RESOLVED;
                   }
15              }
           }
           return(SUCCESS);
       }

20     model_currentData::setreply(tl1_resp_t *pTL1Response)
       {
           return(model_top::setreply(pTL1Response));
       }

25     model_currentData::actionreply(tl1_resp_t *pTL1Response)
       {
           return(SUCCESS);
       }

30
       /************************************************************************
                       class "ds1TTPSinkCurrentData"
       ************************************************************************/
       /* This section of code includes line numbers designated as [E##]. These line numbers are not
35     part of the code and are inserted for reference purposes. The line numbers are referenced in
       the section below entitled "Example" */
```

Attorney Docket No.: OASS1000WSW/BBM
bbm/oass/1000.001

- 55 -

```
[E01]  class model_dsITTPSinkCurrentData : public model_currentData {

[E02]  protected:
[E03]    virtual int get();
[E04]    virtual int set();
[E05]    virtual int action();
[E06]    virtual int notification(tl1_resp_t *pTL1Response);
[E07]    virtual int getreply(tl1_resp_t *pTL1Response);
[E08]    virtual int setreply(tl1_resp_t *pTL1Response);
[E09]    virtual int actionreply(tl1_resp_t *pTL1Response);

[E10]  public:
[E11]    model_dsITTPSinkCurrentData()   /* constructor */
[E12]    {
[E13]      /* should not need to call the constructors implicitly...
[E14]      model_top::model_top();
[E15]      model_currentData::model_currentData();
[E16]      */

[E17]      validAttrList[validNbrAttrs] = "cV";
[E18]      validNbrAttrs++;
[E19]      validAttrList[validNbrAttrs] = "eS";
[E20]      validNbrAttrs++;
[E21]      validAttrList[validNbrAttrs] = "sES";
[E22]      validNbrAttrs++;
[E23]    }
[E24]  };

[E25]  model_dsITTPSinkCurrentData::get()
[E26]  {
[E27]    int i;
[E28]    int rc;

[E29]    /* do the level above */
[E30]    rc=model_currentData::get();
```

Attorney Docket No.: OASS1000WSW/BBM
bbm/oass/1000.001

- 56 -

```
[E31] if (MapModifierBasedOnObjectClass(model_ModifierTable,
[E32]                          pMapperMsg->ObjectClassName,
[E33]                          modifier) == FAILURE) {
[E34]     /* return an error code */
[E35]     return(NOMODTRANSLATION);
[E36] }
[E37] if (MapAIDBasedOnNamingAttributes(model_AIDTable,
[E38]                          pMapperMsg->nNamingAttributes,
[E39]                          pMapperMsg->NamingAttributes,
[E40]                          AID) == FAILURE) {
[E41]     /* return an error code */
[E42]     return(NOAIDTRANSLATION);
[E43] }

[E44] registers[0] = '\0';
[E45] registertwo[0] = '\0';
[E46] for (i=0; i<pMapperMsg->nAttrs; i++) {
[E47]    if (pMapperMsg->Attrs[i]->MappingStatus == NOTMAPPED) {
[E48]       if (strstr(pMapperMsg->Attrs[i]->AttributeName, "FE") == 0) {
[E49]          if (MapAttributeListToTL1Spelling(model_SpellingIndex,
[E50]                          model_SpellingTable,
[E51]                          pMapperMsg->Attrs[i],
[E52]                          pMapperMsg,
[E53]                          registers) == SUCCESS) {
[E54]             if (registers[0] != '\0')
[E55]                pMapperMsg->Attrs[i]->MappingStatus = MAPPED;
[E56]          }
[E57]       }
[E58]       else {
[E59]          if (MapAttributeListToTL1Spelling(model_SpellingIndex,
[E60]                          model_SpellingTable,
[E61]                          pMapperMsg->Attrs[i],
[E62]                          pMapperMsg,
[E63]                          registertwo) == SUCCESS) {
[E64]             if (registertwo[0] != '\0')
[E65]                pMapperMsg->Attrs[i]->MappingStatus = MAPPED;
```

Attorney Docket No.: OASS1000WSW/BBM
bbm/oass/1000.001

- 57 -

```
[E66]    }
[E67]  }
[E68] }
[E69] }

[E70] if (registers[0] != '\0') {
[E71]    /* constructor function generates a new CTAG */
[E72]    pTL1Command = new TL1Command;

[E73]    /*--------------------------------------------*/
[E74]    /* map to command: RTRV-PM-%T1:%TID:%AID:%CTAG::%ATTR; */
[E75]    /*--------------------------------------------*/
[E76]    sprintf(pTL1Command->CommandString,
[E77]           "RTRV-PM-%s:%s:%s:%s::%s;", modifier,
[E78]           pMapperMsg->TID, AID, pTL1Command->CTAG, registers);

[E79]    /* send command function queues and sends */
[E80]    pTL1Command->sendCommand(pMapperMsg);
[E81]    delete pTL1Command;
[E82] }
[E83] if (registertwo[0] != '\0') {
[E84]    /* constructor function generates a new CTAG */
[E85]    pTL1Command = new TL1Command;

/*--------------------------------------------*/
         /* map to command: RTRV-PM-%T1:%TID:%AID:%CTAG::%ATTR,,FEND; */
         /*--------------------------------------------*/
         sprintf(pTL1Command->CommandString,
                "RTRV-PM-%s:%s:%s:%s::%s,,FEND;", modifier,
                pMapperMsg->TID, AID, pTL1Command->CTAG, registertwo);

/* send command function queues and sends */
         pTL1Command->sendCommand(pMapperMsg);
         delete pTL1Command;
}
return(rc);
```

Attorney Docket No.: OASS1000WSW/BBM
bbm/oass/1000.001

- 58 -

```
        } model_dsITTPSinkCurrentData::set()
        {
5           int i;
            int rc;

/* do the level above */
            rc = model_currentData::set();
10
            if (MapModifierBasedOnObjectClass(model_ModifierTable,
                            pMapperMsg->ObjectClassName,
                            modifier) == FAILURE) {
                /* return an error code */
15              return(NOMODTRANSLATION);
            }
            if (MapAIDBasedOnNamingAttributes(model_AIDTable,
                            pMapperMsg->nNamingAttributes,
                            pMapperMsg->NamingAttributes,
20                          AID) == FAILURE) {
                /* return an error code */
                return(NOAIDTRANSLATION);
            }

25          registers[0] = '\0';
            registertwo[0] = '\0';
            values[0] = '\0';
            valuetwo[0] = '\0';

30          for (i=0; i<pMapperMsg->nAttrs; i++) {
                if (strstr(pMapperMsg->Attrs[i]->AttributeName, "FE") != 0) {
                    if (MapAttributeListToTL1Spelling(model_SpellingIndex,
                                    model_SpellingTable,
                                    pMapperMsg->Attrs[i],
35                                  pMapperMsg,
                                    registertwo) == SUCCESS) {
```

Attorney Docket No.: OASS1000WSW/BBM
bbm/oass/1000.001

- 59 -

```
           if (MapAttributeValues(pMapperMsg->Attrs[i], valuetwo) == FAILURE) {
               /* return error code */
               return(NOVALUETRANSLATION);
           }
5        }
       }
       else {
         if (MapAttributeListToTL1Spelling(model_SpellingIndex,
                                          model_SpellingTable,
10                                         pMapperMsg->Attrs[i],
                                          pMapperMsg,
                                          registers) == SUCCESS) {
           if (MapAttributeValues(pMapperMsg->Attrs[i],
                                  values) == FAILURE) {
15             /* return error code */
               return(NOVALUETRANSLATION);
           }
         }
       }
20   } if (values[0] != '\0') {
         /* constructor function generates a new CTAG */
         pTL1Command = new TL1Command;
25
         /*----------------------------------------------*/
         /* map to command: INIT-REG-%T1:%TID:%AID:%CTAG::%ATTR,value; */
         /*----------------------------------------------*/
         sprintf(pTL1Command->CommandString,
30             "INIT-REG-%s:%s:%s:%s::%s,%s;", modifier,
                pMapperMsg->TID, AID, pTL1Command->CTAG, registers, values);

/* send command function queues and sends */
         pTL1Command->sendCommand(pMapperMsg);
35       delete pTL1Command;
     }
```

Attorney Docket No.: OASS1000WSW/BBM
bbm/oass/1000.001

- 60 -

```
     if (valuetwo[0] != '\0') {
         /* constructor function generates a new CTAG */
         pTL1Command = new TL1Command;

5        /*--------------------------------------------------*/
         /* map to: INIT-REG-%T1:%TID:%AID:%CTAG::%ATTR,value,FEND; */
         /*--------------------------------------------------*/
         sprintf(pTL1Command->CommandString,
             "INIT-REG-%s:%s:%s:%s::%s,%s,FEND;", modifier,
10           pMapperMsg->TID, AID, pTL1Command->CTAG, registertwo, valuetwo);

/* send command function queues and sends */
         pTL1Command->sendCommand(pMapperMsg);
         delete pTL1Command;
15   }
     return(rc);
 } model_ds1TTPSinkCurrentData::action()
20   {
         return(SUCCESS);
     } model_ds1TTPSinkCurrentData::notification(tl1_resp_t *pTL1Response)
25   {
         return(model_currentData::notification(pTL1Response));
     }

30   model_ds1TTPSinkCurrentData::getreply(tl1_resp_t *pTL1Response)
     {
         char *paid;
         char *pstartingaid;
         int  aid_index;
35       mapr_msg_t *pOldMapperMsg;
```

Attorney Docket No.: OASS1000WSW/BBM
bbm/oass/1000.001

- 61 -

```
        /* do the level above */
        model_currentData::getreply(pTL1Response);

pstartingaid=(char *)pTL1Response->aidvals;
 5
        for (aid_index=0; aid_index < pTL1Response->aid_index; aid_index++) {

/* zero terminate the aid */
            paid=strchr((char *)&pTL1Response->aidvals[aid_index], ',');
10          *paid = '\0';
            paid++;

if (!strcmp(pstartingaid, (char *)&pTL1Response->aidvals[aid_index])) {
                /* if response is RTRV-PM ... */
15              if (!strncmp(GetOriginalVerb(pTL1Response->ctag),
                        "RTRV-PM-", 8))
                    MapTL1Attribute(model_SpellingIndex, model_SpellingTable,
                            pMapperMsg, paid);
            }
20          else {      /* we got to a different aid */

/* at this point, the pstarting aid is the current aid and if we
                   assume that all the responses for one aid are grouped together,
                   all the attribute information that we can expect has arrived.
25                 We should duplicate the queue entry if this is not the last time
                   through and continue gathering information. After duplicating
                   we should map the aid to a single naming attribute and set it. */ pOldMapperMsg = pMapperMsg;
30
                if (aid_index < ((pTL1Response->aid_index)-1))
                    pMapperMsg = DuplicateMapperQueue(pMapperMsg);

pOldMapperMsg->nNamingAttributes = 1;
35              pOldMapperMsg->NamingAttributes[0] =
                        MapNamingAttributeBasedOnAID(model_AIDTable, pstartingaid);
```

Attorney Docket No.: OASS1000WSW/BBM
bbm/oass/1000.001

- 62 -

```
              pstartingaid = (char *)&pTL1Response->aidvals[aid_index];
              MapTL1Attribute(model_SpellingIndex, model_SpellingTable,
                      pMapperMsg, paid);
          }
5     }
      pMapperMsg->nNamingAttributes = 1;
      pMapperMsg->NamingAttributes[0] =
          MapNamingAttributeBasedOnAID(model_AIDTable, pstartingaid);
      return(SUCCESS);
10  } model_ds1TTPSinkCurrentData::setreply(tl1_resp_t *pTL1Response)
    {
        return(model_currentData::setreply(pTL1Response));
15  } model_ds1TTPSinkCurrentData::actionreply(tl1_resp_t *pTL1Response)
    {
        /* do the level above */
20      return(model_currentData::actionreply(pTL1Response));
    }

/***************************************************************
25                class "ds1LineTTPSinkCurrentData"
    ***************************************************************/
    class model_ds1LineTTPSinkCurrentData : public model_ds1TTPSinkCurrentData { protected:
30      virtual int get();
        virtual int set();
        virtual int action();
        virtual int notification(tl1_resp_t *pTL1Response);
        virtual int getreply(tl1_resp_t *pTL1Response);
35      virtual int setreply(tl1_resp_t *pTL1Response);
        virtual int actionreply(tl1_resp_t *pTL1Response);
```

Attorney Docket No.: OASS1000WSW/BBM
bbm/oass/1000.001

- 63 -

```
       public:
           model_ds1LineTTPSinkCurrentData()
           {
5      #if 0
               model_top::model_top();
               model_currentData::model_currentData();
               model_ds1TTPSinkCurrentData::model_ds1TTPSinkCurrentData();
       #endif
10             validAttrList[validNbrAttrs] = "eSFE";
               validNbrAttrs++;
               validAttrList[validNbrAttrs] = "IOSS";
               validNbrAttrs++;
           }
15     };

model_ds1LineTTPSinkCurrentData::get()
       {
           return(model_ds1TTPSinkCurrentData::get());
20     } model_ds1LineTTPSinkCurrentData::set()
       {
           return(model_ds1TTPSinkCurrentData::set());
25     } model_ds1LineTTPSinkCurrentData::action()
       {
           return(model_ds1TTPSinkCurrentData::action());
30     } model_ds1LineTTPSinkCurrentData::notification(tl1_resp_t *pTL1Response)
       {
           return(model_ds1TTPSinkCurrentData::notification(pTL1Response));
35     }
```

Attorney Docket No.: OASS1000WSW/BBM
bbm/oass/1000.001

- 64 -

```
model_ds1LineTTPSinkCurrentData::getreply(tl1_resp_t *pTL1Response)
{
    return(model_ds1TTPSinkCurrentData::getreply(pTL1Response));
} model_ds1LineTTPSinkCurrentData::setreply(tl1_resp_t *pTL1Response)
{
    return(model_ds1TTPSinkCurrentData::setreply(pTL1Response));
} model_ds1LineTTPSinkCurrentData::actionreply(tl1_resp_t *pTL1Response)
{
    return(model_ds1TTPSinkCurrentData::actionreply(pTL1Response));
}

/***********************************************************************
              class "ds1PathTTPSinkCurrentData"
***********************************************************************/
class model_ds1PathTTPSinkCurrentData : public model_ds1TTPSinkCurrentData { protected:
    virtual int get();
    virtual int set();
    virtual int action();
    virtual int notification(tl1_resp_t *pTL1Response);
    virtual int getreply(tl1_resp_t *pTL1Response);
    virtual int setreply(tl1_resp_t *pTL1Response);
    virtual int actionreply(tl1_resp_t *pTL1Response);

public:
    model_ds1PathTTPSinkCurrentData()
    {
#if 0
        model_top::model_top();
```

Attorney Docket No.: OASS1000WSW/BBM
bbm/oass/1000.001

- 65 -

```
        model_currentData::model_currentData();
        model_ds1TTPSinkCurrentData::model_ds1TTPSinkCurrentData();
endif 5          validAttrList[validNbrAttrs] = "sAS";
            validNbrAttrs++;
            validAttrList[validNbrAttrs] = "uAS";
            validNbrAttrs++;
            validAttrList[validNbrAttrs] = "aISS";
10          validNbrAttrs++;
            validAttrList[validNbrAttrs] = "cSS";
            validNbrAttrs++;
            validAttrList[validNbrAttrs] = "cSSFE";
            validNbrAttrs++;
15          validAttrList[validNbrAttrs] = "cVFE";
            validNbrAttrs++;
            validAttrList[validNbrAttrs] = "eSA";
            validNbrAttrs++;
            validAttrList[validNbrAttrs] = "eSAFE";
20          validNbrAttrs++;
            validAttrList[validNbrAttrs] = "eSB";
            validNbrAttrs++;
            validAttrList[validNbrAttrs] = "eSBFE";
            validNbrAttrs++;
25          validAttrList[validNbrAttrs] = "eSFE";
            validNbrAttrs++;
            validAttrList[validNbrAttrs] = "sASFE";
            validNbrAttrs++;
            validAttrList[validNbrAttrs] = "sESFE";
30          validNbrAttrs++;
            validAttrList[validNbrAttrs] = "uASFE";
            validNbrAttrs++;
        }
    };
35
    model_ds1PathTTPSinkCurrentData::get()

Attorney Docket No.: OASS1000WSW/BBM
bbm/oass/1000.001
```

- 66 -

```
        {
            return(model_ds1TTPSinkCurrentData::get());
        }

5      model_ds1PathTTPSinkCurrentData::set()
        {
            return(model_ds1TTPSinkCurrentData::set());
        }

10      model_ds1PathTTPSinkCurrentData::action()
        {
            return(model_ds1TTPSinkCurrentData::action());
        }

15      model_ds1PathTTPSinkCurrentData::notification(tl1_resp_t *pTL1Response)
        {
            return(model_ds1TTPSinkCurrentData::notification(pTL1Response));
        }

20      model_ds1PathTTPSinkCurrentData::getreply(tl1_resp_t *pTL1Response)
        {
            return(model_ds1TTPSinkCurrentData::getreply(pTL1Response));
        }

25      model_ds1PathTTPSinkCurrentData::setreply(tl1_resp_t *pTL1Response)
        {
            return(model_ds1TTPSinkCurrentData::setreply(pTL1Response));
        }

30      model_ds1PathTTPSinkCurrentData::actionreply(tl1_resp_t *pTL1Response)
        {
            return(model_ds1TTPSinkCurrentData::actionreply(pTL1Response));
        }
```

I claim:

1. A telecommunications gateway method for use with a source of network management messages provided in a first syntax and a plurality of network elements, each network element adapted to respond to network management messages provided in respective element syntaxes, comprising the steps of:

receiving a first message from said source, said first message being in said first syntax and identifying at least a particular one of said network elements;

selecting a dictionary from a plurality of dictionaries in response to said identification of said particular one of said network elements;

queuing state information relating to said first message and said second message, said first message includes a command, a first syntax command reference identification and a network element identification, said state information includes said first syntax command reference identification and a respective element syntax command reference identification;

mapping said first message into at least a second message in response to said selected dictionary, said second message being in a respective element syntax associated with said identified particular one of said network elements, said second message includes said respective element syntax command reference identification; and transmitting said second message to said particular one of said network elements.

2. A method according to claim 1, further including the step of:

mapping said first message into a third message in response to said selected dictionary, said third message being in said respective element syntax associated with said identified particular one of said network elements;

transmitting said third message to said particular one of said network elements.

3. A method according to claim 1, said step of selecting a dictionary includes the step of accessing configuration data based on said identification, said configuration data including an identification of said selected dictionary.

4. A method according to claim 1, further including the steps of:

receiving a third message from said particular one of said network elements, said third message being in said respective element syntax;

selecting said dictionary from a plurality of dictionaries;

mapping said third message into at least a fourth message in response to said selected dictionary, said fourth message being in said first syntax; and transmitting said fourth message to said source.

5. A method according to claim 1, wherein said first syntax is CMIP.

6. A method for allowing a plurality of legacy telecommunications network elements to be used with a Common Management Information Protocol, comprising the steps of:

receiving CMIP syntax including a legacy equipment identification which identifies at least one of said plurality of legacy telecommunications network elements;

queuing state information corresponding to said CMIP syntax;

accessing a dictionary based on said legacy equipment identification;

mapping said CMIP syntax into legacy syntax based on said dictionary;

sending a first legacy syntax message, based on said CMIP syntax, to said at least one of said plurality of legacy telecommunications network elements.

7. A method according to claim 6, wherein:

said step of receiving CMIP syntax includes receiving a CMIP reference identification;

said state information includes said CMIP reference identification and a legacy syntax message identification which corresponds to said CMIP reference identification; and said first legacy syntax message includes said legacy syntax message identification.

8. A method according to claim 6, further including the step of:

sending a second legacy syntax message, based on said CMIP syntax, to said at least one of said plurality of legacy telecommunications network elements.

9. A method according to claim 6, further including the step of:

sending a second legacy syntax message, based on said CMIP syntax, to a second one of said plurality of legacy telecommunications network elements.

10. A method according to claim 6, further including the steps of receiving a legacy syntax response;

searching said queue for said state information;

accessing said dictionary; and mapping said legacy syntax response into CMIP syntax.

11. A method according to claim 10, further including the step of:

sending said CMIP syntax to an agent.

12. A method according to claim 6, further including the steps of:

receiving a legacy syntax autonomous message;

accessing said dictionary; and mapping said legacy syntax autonomous message into CMIP syntax.

13. A method according to claim 12, further including the step of:

filtering said legacy syntax autonomous message.

14. A method according to claim 6, wherein:

said step of receiving CMIP syntax includes receiving a CMIP reference identification;

said state information includes said CMIP reference identification and a legacy syntax message identification which corresponds to said CMIP reference number; and said system further includes the steps of:

receiving a legacy syntax response including said legacy syntax message identification, searching said queue for said state information, accessing said dictionary, and mapping said legacy syntax response into CMIP syntax.

15. A computer readable storage medium having computer readable program code embodied on said computer readable storage medium, said computer readable program code for use with a source of network management messages provided in a first syntax and a plurality of network elements, each network element adapted to respond to network management messages provided in respective network element syntaxes, said computer readable program code including:

mapper program code including a command logic program code and response logic program code;

said command logic program code receives a CMIP syntax command from said source identifying a particular one of said network elements, selects a dictionary from a plurality of dictionaries in response to said identification of said particular one of said network elements, maps said CMIP syntax command into at least one second syntax command; and said response logic program code receives a second syntax response identifying said particular one of said network elements, selects said dictionary based on said identification, and maps said second syntax response to a CMIP syntax response.

16. A computer readable storage medium according to claim 15, wherein:

said computer readable program code maintains a queue;

said command logic program code queues state information relating to said CMIP syntax command and said at least one second syntax command; and said response logic program code accesses said queue after receiving said second syntax response.

17. A computer readable storage medium according to claim 15, wherein said computer readable program code further includes:

command generator program code, in communication with said mapper program code, said command generator program code forwards respective network element syntax commands to said plurality of network elements; and response handler program code, in communication with said mapper program code, said response handler program code receives respective network element syntax responses from said plurality of network elements and communicates said respective network element syntax responses to said mapper program code.

18. A method for allowing a plurality of legacy telecommunications network elements to be used with a Common Management Information Protocol, comprising the steps of:

receiving CMIP syntax including a legacy equipment identification which identifies at least one of said plurality of legacy telecommunications network elements;

mapping said CMIP syntax into legacy syntax based on a dictionary; and sending a first legacy syntax message, based on said CMIP syntax, to said at least one of said plurality of legacy telecommunications network elements.

19. A method according to claim 18, further including the step of: accessing and dictionary based on said legacy equipment identification.

20. A method according to claim 19, further including the step of:

initializing a configuration database, said configuration database stores configuration data for said plurality of legacy telecommunications network elements, said configuration data includes an identification of a corresponding dictionary for each of said plurality of legacy telecommunications network elements, said step of accessing a dictionary includes accessing said configuration database using said legacy equipment identification.

21. A method according to claim 18, further including the step of:

queuing state information corresponding to said CMIP syntax.

22. A method according to claim 21, wherein:

said step of receiving CMIP syntax includes receiving a CMIP reference identification;

said state information includes said CMIP reference identification and a legacy syntax message identification which corresponds to said CMIP reference identification; and said first legacy syntax message includes said legacy syntax message identification.

23. A method according to claim 21, further including the steps of:

receiving a legacy syntax response;

searching said queue for said state information;

accessing said dictionary; and mapping said legacy syntax response into CMIP syntax.

24. A method according to claim 18, further including the steps of:

receiving a legacy syntax autonomous message;

accessing said dictionary; and mapping said legacy syntax autonomous message into CMIP syntax.

25. A method according to claim 24, wherein:

said legacy syntax autonomous message is an alarm; and said method further includes the step of intelligently filtering said alarm.

26. A processor readable storage medium, comprising:

processor readable program code embodied on said processor readable storage medium, said processor readable program code for programming a processor to perform a method for allowing a plurality of legacy telecommunications network elements to be used with a Common Management Information Protocol (CMIP), the method comprising the steps of:

receiving CMIP syntax including a legacy equipment identification which identifies at least one of said plurality of legacy telecommunications network elements;

mapping said CMIP syntax into legacy syntax based on a dictionary; and sending a first legacy syntax message, based on said CMIP syntax, to said at least one of said plurality of legacy telecommunications network elements.

27. A processor readable storage medium according to claim 26, wherein the method further includes the step of:

accessing said dictionary based on said legacy equipment identification.

28. A processor readable storage medium according to claim 27, wherein the method further includes the step of:

initializing a configuration database, said configuration database stores configuration data for said plurality of legacy telecommunications network elements, said configuration data includes an identification of a corresponding dictionary for each of said plurality of legacy telecommunications network elements, said step of accessing a dictionary includes accessing said configuration database using said legacy equipment identification.

29. A processor readable storage medium according to claim 26, wherein the method further includes the step of:

queuing state information corresponding to said CMIP syntax.

30. A processor readable storage medium according to claim 29, wherein:

said step of receiving CMIP syntax includes receiving a CMIP reference identification;

said state information includes said CMIP reference identification and a legacy syntax message identification which corresponds to said CMIP reference identification; and said first legacy syntax message includes said legacy syntax message identification.

31. A processor readable storage medium according to claim 27, wherein the method further includes the steps of:

queuing state information corresponding to said CMIP syntax; and accessing a dictionary based on said legacy equipment identification.

32. A processor readable storage medium according to claim 27, wherein the method further includes the steps of:

receiving a legacy syntax response;

searching said queue for said state information;

accessing said dictionary; and mapping said legacy syntax response into CMIP syntax.

33. A processor readable storage medium according to claim 27, wherein the method further includes the steps of:

receiving a legacy syntax autonomous message;

accessing said dictionary; and mapping said legacy syntax autonomous message into CMIP syntax.

34. A processor readable storage medium according to claim 33, wherein:

said legacy syntax autonomous message is an alarm; and said method further includes the step of intelligently filtering said alarm.

35. An apparatus for allowing a plurality of legacy telecommunications network elements to be used with a Common Management Information Protocol (CMIP), comprising:

a memory adapted to store program code; and a processor in communication with said memory, said program code capable of programming said processor to perform a method for allowing a plurality of legacy telecommunications network elements to be used with a Common Management Information Protocol (CMIP), the method comprising the steps of:

receiving CMIP syntax including a legacy equipment identification which identifies at least one of said plurality of legacy telecommunications network elements, mapping said CMIP syntax into legacy syntax based on a dictionary, and sending a first legacy syntax message, based on said CMIP syntax, to said at least one of said plurality of legacy telecommunications network elements.

36. An apparatus according to claim 35, wherein the method further includes the step of:

accessing said dictionary based on said legacy equipment identification.

37. An apparatus according to claim 35, wherein the method further includes the step of:

queuing state information corresponding to said CMIP syntax.

38. An apparatus according to claim 37, wherein:

said step of receiving CMIP syntax includes receiving a CMIP reference identification;

said state information includes said CMIP reference identification and a legacy syntax message identification which corresponds to said CMIP reference identification; and said first legacy syntax message includes said legacy syntax message identification.

39. An apparatus according to claim 35, wherein the method further includes the steps of receiving a legacy syntax response;

searching said queue for said state information;

accessing said dictionary; and mapping said legacy syntax response into CMIP syntax.

40. A processor readable storage medium, comprising:

processor readable program code embodied on said processor readable storage medium, said processor readable program code for programming a processor to perform telecommunications gateway method for use with a source of network management messages provided in a first syntax and a plurality of network elements, each network element adapted to respond to network management messages provided in respective element syntaxes, the method comprising the steps of:

initializing a configuration database, said configuration database stores configuration data for said plurality of network elements, said configuration data includes an identification of a corresponding dictionary for each of said plurality of network elements;

receiving a first message, said first message being in said first syntax and identifying at least a particular one of said network elements;

accessing said configuration data using said identification of said particular one of said network elements;

selecting a dictionary from a plurality of dictionaries based on said step of accessing said configuration data;

mapping said first message into at least a second message in response to said selected dictionary, said second message being in a respective element syntax associated with said identified particular one of said network elements; and transmitting said second message to said particular one of said network elements.

41. A processor readable storage medium, comprising:

processor readable program code embodied on said processor readable storage medium, said processor readable program code for programming a processor to perform telecommunications gateway method for use with a source of network management messages provided in a first syntax and a plurality of network elements, each network element adapted to respond to network management messages provided in respective element syntaxes, the method comprising the steps of:

receiving a first message, said first message being in said first syntax and identifying at least a particular one of said network elements;

selecting a dictionary from a plurality of dictionaries based on said identification of said particular one of said network elements;

mapping said first message into at least a second message in response to said selected dictionary, said second message being in a respective element syntax associated with said identified particular one of said network elements;

transmitting said second message to said particular one of said network elements;

receiving an autonomous message, said autonomous message being in said respective element syntax, said autonomous message is an alarm; and intelligently filtering said alarm.

* * * * *